(12) United States Patent
Kimura

(10) Patent No.: US 8,019,929 B2
(45) Date of Patent: Sep. 13, 2011

(54) DATA PROCESSING APPARATUS AND DATA CONTROL CIRCUIT FOR USE THEREIN

(75) Inventor: Hiromitsu Kimura, Kyoto (JP)

(73) Assignee: Rohm Co., Ltd., Kyoto (JP)

(*) Notice: Subject to any disclaimer, the term of this patent is extended or adjusted under 35 U.S.C. 154(b) by 541 days.

(21) Appl. No.: 11/853,923

(22) Filed: Sep. 12, 2007

(65) Prior Publication Data

US 2008/0071972 A1 Mar. 20, 2008

(30) Foreign Application Priority Data

Sep. 13, 2006 (JP) ................. 2006-248057
Jan. 31, 2007 (JP) ................. 2007-020445
Apr. 11, 2007 (JP) ................. 2007-103997

(51) Int. Cl.
*G06F 12/00* (2006.01)

(52) U.S. Cl. ........................ 711/103; 365/228
(58) Field of Classification Search .......... 711/103; 365/228
See application file for complete search history.

(56) References Cited

U.S. PATENT DOCUMENTS

| | | | | |
|---|---|---|---|---|
| 4,953,123 A * | 8/1990 | Takeuchi et al. | ................. | 365/66 |
| 5,392,438 A * | 2/1995 | Gunji | ............................ | 713/323 |
| 5,978,923 A * | 11/1999 | Kou | ............................... | 713/323 |
| 7,457,914 B2 * | 11/2008 | Cordella et al. | ............... | 711/112 |
| 2003/0056144 A1* | 3/2003 | Itoh et al. | ......................... | 714/15 |
| 2005/0195664 A1* | 9/2005 | Ooishi | .......................... | 365/194 |
| 2006/0157573 A1* | 7/2006 | Nishizawa et al. | ........... | 235/492 |
| 2008/0005451 A1 | 1/2008 | Tanigawa | | |

FOREIGN PATENT DOCUMENTS

| | | |
|---|---|---|
| JP | 58-169218 | 10/1983 |
| JP | 03-163617 | 7/1991 |
| JP | 04-107725 | 4/1992 |
| JP | 10-078836 | 3/1998 |
| JP | 2004-186874 | 7/2004 |
| WO | WO 2006/033266 | 3/2006 |

* cited by examiner

*Primary Examiner* — Hashem Farrokh
(74) *Attorney, Agent, or Firm* — Fish & Richardson P.C.

(57) ABSTRACT

A data processing apparatus has a data saving control portion. At shutdown, within the period after a fall in the source voltage is detected until the source voltage falls down to the lower limit at which the apparatus is guaranteed to operate, the data saving control portion saves to a non-volatile memory all the data needed to restore the state of an electronic circuit portion.

20 Claims, 22 Drawing Sheets

DATA PROCESSING APPARATUS AND DATA CONTROL CIRCUIT FOR USE THEREIN

This application is based on Japanese Patent Applications Nos. 2006-248057, 2007-020445, and 2007-103997 filed on Sep. 13, 2006, Jan. 31, 2007, and Apr. 11, 2007 respectively, the contents of which are hereby incorporated by reference.

BACKGROUND OF THE INVENTION

1. Field of the Invention

The present invention relates to data processing apparatuses (microprocessors, image processors, multimedia processors, IP cores, personal computers, network servers, mobile devices, game machines, PDAs (personal digital/data assistants), and the like) provided with an electronic circuit portion, and to data control circuits for use therein. More particularly, the present invention relates to a technique used therein for saving/restoring data.

2. Description of Related Art

Conventionally, temporarily stored data such as register data of an electronic circuit portion of a data processing apparatus is lost at shutdown, and, even after the power comes back on, it is impossible to restore the lost data to the original state. As a result, if an unintended power shutdown such as a power failure occurs, the conventional data processing apparatus suffers damage such as loss of data that is being worked on.

In addition, for a data processing apparatus such as a personal computer that needs software control, it is necessary to reload software when the power is turned on again. This makes it time-consuming to turn the power on/off (to start up the hardware), putting an unnecessary stress on a user. It is for this reason that the conventional data processing apparatus does not allow power to the electronic circuit portion to be easily shut down even when the electronic circuit portion is on standby. This undesirably increases wasteful power consumption.

Examples of a conventional technology related to what has been described thus far are seen in JP-A-S58-169218, JP-A-H4-107725, JP-A-2004-186874, JP-A-H10-78836, and JP-A-H3-163617 (hereinafter referred to as "Patent Documents 1 to 5" respectively).

Patent Document 1 discloses a power shutdown/restoration method by which, in a data processing apparatus storing a running state of a program that is being executed at the time of power off, such that continued execution of the program is made possible when power is restored (that is, an apparatus that can retain the program by means of battery or the like even if a power shutdown occurs), the data processing apparatus being provided with off-state detecting means for detecting that the power is turned off; a plurality of stack areas that store program running states during power off; and judging means for judging whether or not a running program stored in the stack areas is a power shutdown program that operates during power off, when the power is in a shutdown state, the program running states are sequentially stored in the plurality of stack areas; when power is restored, the program running states are sequentially read until a program other than the power shutdown program is read.

Patent Document 2 discloses a data saving/restoring method that restores data as follows. Judgment is made at regular intervals as to whether each area of a buffer memory satisfies a saving condition, and the data stored in the area that satisfies the saving condition is saved to a magnetic disk device. If a trouble occurs in the buffer memory, invalid area determining means differentiates between the area to which valid data is saved and the area to which invalid data is saved, such that the area to which the valid data is saved is restored by using the data saved to the magnetic disk device, and the area to which the invalid data is saved is restored based on the update history information.

Patent Document 3, which the applicant of the present invention once filed, discloses and proposes a data retaining apparatus provided with: a data retaining circuit that retains data, at the time of latching of data, by connecting first and second inverter circuits in a loop; and a non-volatile storage device that stores, at the time of writing of data, with one end thereof connected to an input node of the first inverter circuit, a non-volatile state corresponding to data existing in the data retaining circuit, and that releases, at the time of restoration of data, an electrical charge corresponding to the stored non-volatile state at the input node of the first inverter circuit, the electrical charge causing a voltage that is higher or lower than a threshold voltage of the first inverter circuit to appear at the input node of the first inverter circuit, by connecting the one end thereof to the input node of the first inverter circuit and receiving a read signal at the other end thereof. The data retaining circuit has a loop connecting/disconnecting gate inserted between a non-volatile storage device connection node at which the input node of the first inverter circuit and the one end of the non-volatile storage device are connected together and an output node of the second inverter circuit, the loop connecting/disconnecting gate being so controlled, at the time of latching and writing of data, as to be in a connected state, and so controlled, at the time of restoration of data, as to be in a disconnected state during the reception of the read signal and to be shifted in a connected state after a predetermined length of time elapses.

Patent Document 4 discloses and proposes a data processing apparatus for executing an instruction, the processing apparatus provided with: an element including a sequential circuit composed of a plurality of combinatorial logic circuits and a plurality of storage devices to be combined with the plurality of combinatorial logic circuits into a sequential circuit; a memory for saving; a saving/restoring circuit that reads a plurality of internal data stored in the plurality of storage devices and saves the plurality of internal data thus read to the memory for saving, and that reads the plurality of internal data thus saved from the memory for saving and restores the plurality of internal data thus read to the plurality of storage devices; and a power supply switching circuit that switches a source voltage to be fed to the processing apparatus, such that, after the plurality of internal data is saved by the saving/restoring circuit, a source voltage for a standby state is fed to the processing apparatus, and, before the plurality of internal data saved by the saving/restoring circuit is restored, a source voltage for normal operation is fed to the processing apparatus.

Patent Document 5 discloses and proposes a warm boot method for a program in a computer system including a central processing unit having at least a main memory, and an external storage device as needed. In this method, a power-failure interrupt indicating a power shutdown occurs shortly before the power to the computer system is shut down. When the power-failure interrupt occurs, the current states of a register and its peripheral integrated circuit of the central processing unit are saved to a specific address of the main memory, a flag indicating a power failure is set, and the process is on standby until power to the computer system is shut down. Upon shutdown of the power to the computer system, the power to the main memory is switched from a power source to a battery for backup. Upon power-on of the computer system, the power to the main memory is switched from the battery to the power source. At this point, if the flag indicating a power failure is set, the states of the register and its peripheral integrated circuit, the states saved at the occurrence of the power-failure interrupt, are restored to the original states, and the flag indicating a power failure is reset; if the flag indicating a power failure is not set, a control program and a processing program are loaded from the external storage device.

Certainly, with the conventional technologies disclosed in Patent Documents 1 to 5, it is possible to save/restore or retain data of an electronic circuit portion.

However, with the conventional technology disclosed in Patent Document 1, there is a need to provide, in addition to a main power source, a sub power source such as an uninterruptible power supply (UPS) or a battery backup. This undesirably increases the size and cost of the data processing apparatus.

With the technology disclosed in Patent Document 2, it is necessary to perform data backup operation during normal operation. This results in a considerable degradation in performance of the data processing apparatus. In addition, a decreased frequency of data backup disadvantageously increases the amount of data loss.

The conventional technology disclosed in Patent Document 3 simply aims at making it possible for the register used in the data storage circuit provided in the electronic circuit to retain data without power supply, but not at saving/restoring data.

The conventional technology disclosed in Patent Document 4 simply aims at reducing standby leakage current and hence power consumption by switching the source voltage before and after data saving, and does not suggest saving/restoration of data at the time of a power shutdown.

The technology disclosed in Patent Document 5 simply aims at saving/restoring the states of the register and its peripheral integrated circuit of the central processing unit by using a program executed on the central processing unit. This necessitates reloading of a restoration program after each restoration of data, making it time-consuming to turn the power on/off (to start up the hardware). Moreover, giving a data saving/restoring function to an existing system requires making changes in the program because otherwise compatibility of the program cannot maintained. Furthermore, data saving/restoring processing itself is time-consuming if it is handled by software.

SUMMARY OF THE INVENTION

In view of the conventionally experienced problems described above, it is an object of the present invention to provide data processing apparatuses that can appropriately save/restore data of an electronic circuit portion according to power-on/off without the need for a sub power source or data backup operation during normal operation.

It is another object of the present invention to provide data control circuits that can achieve enhancement of the usability of electronic circuits and a reduction in standby power consumption in a short development period and at lower cost by making effective use of the design assets of the existing electronic circuits (such as ICs, LSIs, and IP cores that have already been introduced commercially) without making major changes therein, and to provide data processing apparatuses using such data control circuits.

It is still another object of the present invention to provide data processing apparatuses that can prevent a malfunction thereof even if a plurality of data processing apparatuses complete data restoration with different timing.

To achieve the above object, according to the present invention, a data processing apparatus is provided with a data saving controller that saves, at shutdown, to a non-volatile memory all the data needed to restore the state of an electronic circuit portion within the period after a fall in a source voltage is detected until the source voltage falls down to the lower limit voltage at which the apparatus is guaranteed to operate.

Other features, elements, steps, advantages and characteristics of the present invention will become more apparent from the following detailed description of preferred embodiments thereof with reference to the attached drawings.

DETAILED DESCRIPTION OF PREFERRED EMBODIMENTS

Figure 1:
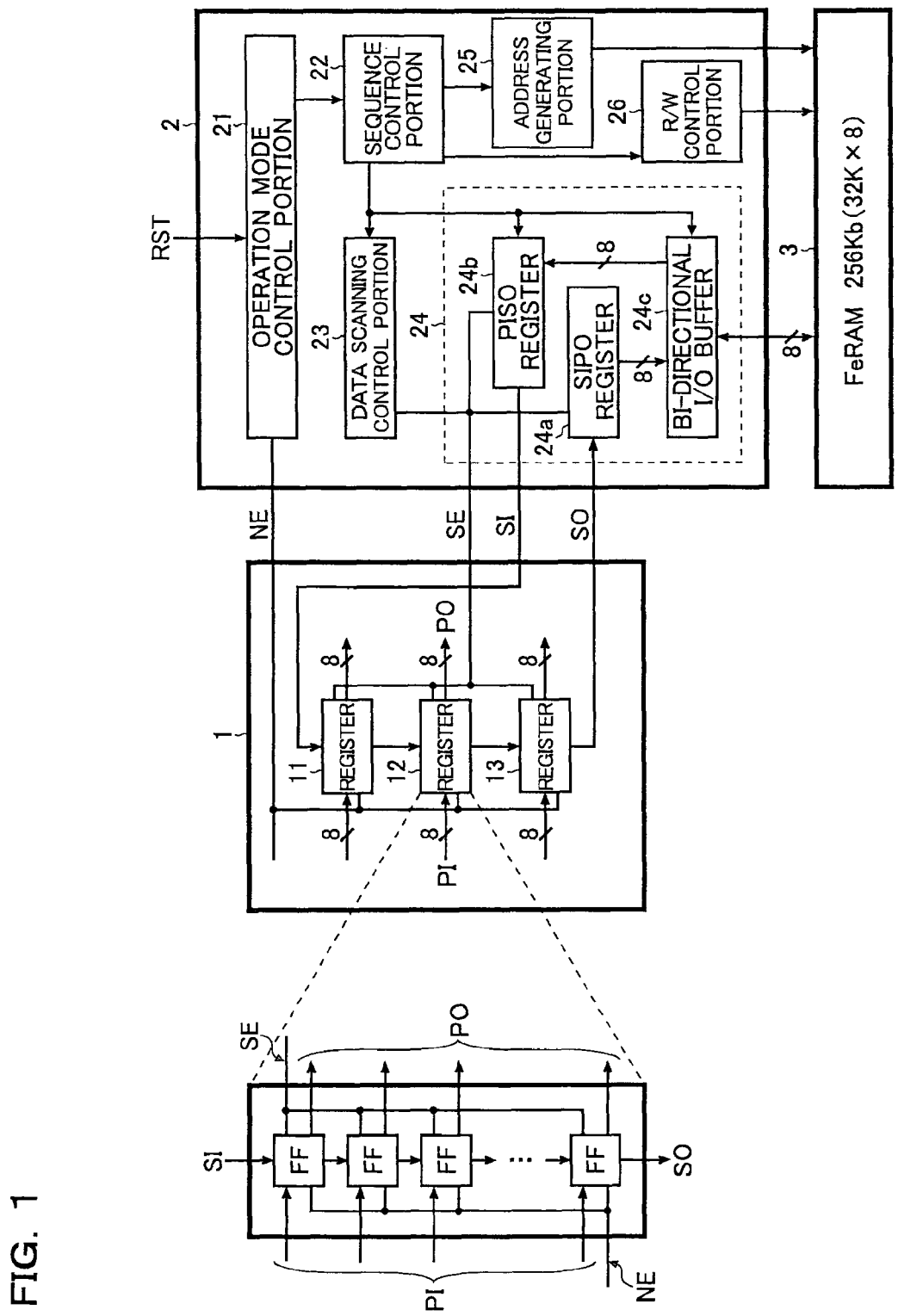
FIG. 1 is a block diagram showing an embodiment of a data processing apparatus according to the present invention.

FIG. 1 is a block diagram showing an embodiment of a data processing apparatus according to the present invention.

As shown in this figure, the data processing apparatus of this embodiment includes an electronic circuit portion 1, a data saving/restoration control portion 2, and a non-volatile memory 3.

The electronic circuit portion 1 is a CMOS logic circuit (for example, a CPU (central processing unit)) that performs operations on data by using a plurality of registers 11 to 13. When the electronic circuit portion 1 is in normal operation, 8-bit parallel signals (PI/PO) are inputted thereto and outputted therefrom via the registers 11 to 13. It is to be noted that the number of registers and the number of input/output bits are not limited to those specifically described above.

On the other hand, the electronic circuit portion 1 of this embodiment has, in addition to a first signal path (an input/output path of parallel signals PI/PO) used in normal operation, a second signal path (an input/output path of serial signals SI/SO; a so-called scan path) provided for switching flip-flops FF, which form each of the registers 11 to 13, into the shift register configuration. The scan path itself is a well-known technique that is widely adopted for debugging a CMOS logic circuit provided with a number of registers, and therefore the detailed description thereof will be omitted. In the electronic circuit portion 1 of this embodiment, the scan path is also used for saving/restoring the register data, such that the register data is inputted/outputted as serial signals (SI/SO). That is, the electronic circuit portion 1 of this embodiment controls the flip-flops FF so as to switch into the shift register configuration based on a normal enable signal NE (which is enabled in normal operation, and is disabled at the time of data saving/restoration) inputted from the data saving/restoration control portion 2.

Based on a reset signal RST for detecting power-on/shutdown, the data saving/restoration control portion 2 serves as a data saving controller that saves, at shutdown, the register data of the electronic circuit portion 1 to the non-volatile memory 3 within the period after a fall in the source voltage VDD is detected until the source voltage VDD falls down to the lower limit voltage at which the apparatus is guaranteed to operate (the lower limit of the source voltage VDD at which the apparatus is guaranteed to operate; for example, 90% of the normal voltage level), and serves as a data restoration controller that restores, at power-on, the register data saved to the non-volatile memory 3 to the electronic circuit portion 1 within the period after the source voltage VDD rises up to the lower limit voltage at which the apparatus is guaranteed to operate until the electronic circuit portion 1 begins to operate.

Figure 2:
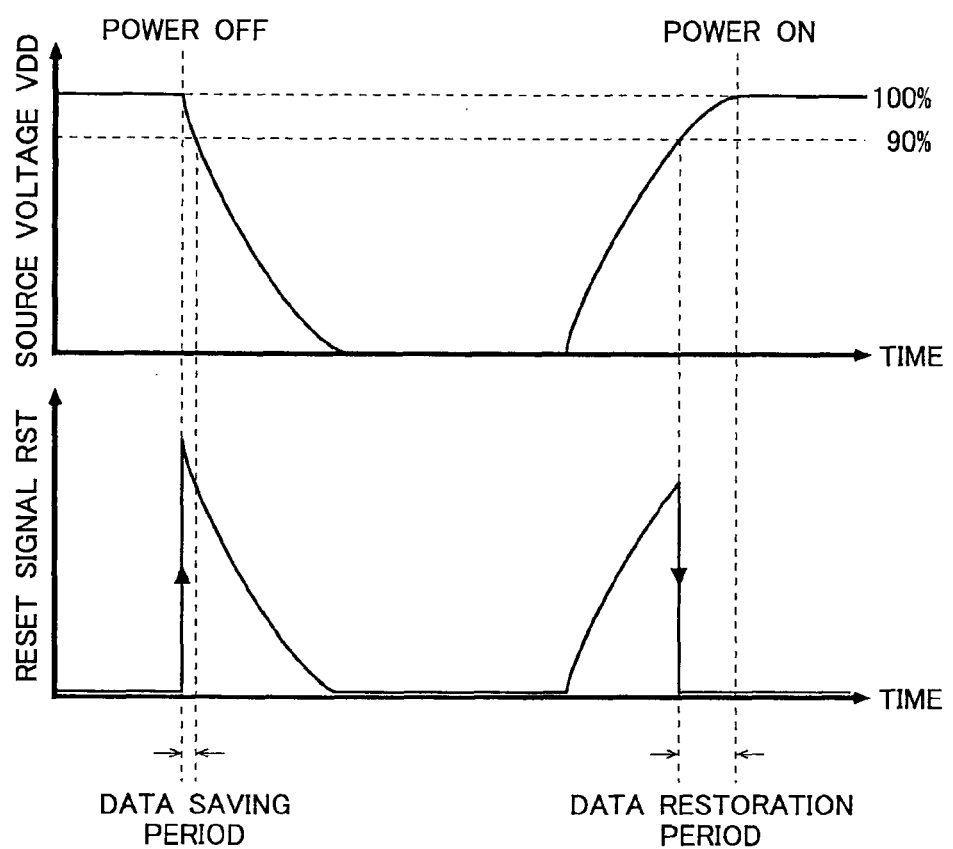
FIG. 2 is a waveform diagram illustrating a data saving period and a data restoring period.

FIG. 2 is a waveform diagram illustrating a data saving period and a data restoring period.

As shown in this figure, the data saving period and the data restoring period are both extremely short periods (several hundreds microseconds (μs)) immediately after shutdown and power-on, respectively. In the data processing apparatus of this embodiment, saving/restoration of register data is completed in such an extremely short period. With this configuration, it is possible to appropriately save/restore the register data of the electronic circuit portion 1 according to power-on/off without the need for a sub power source or data backup operation during normal operation. This helps realize a system in which the register data of the electronic circuit portion 1 is made virtually nonvolatile.

The data saving/restoration control portion 2 of this embodiment includes an operation mode control portion 21, a sequence control portion 22, a data scanning control portion 23, a serial/parallel converting portion 24, an address generating portion 25, and a read/write control portion 26.

The serial/parallel converting portion 24 described above is composed of a SIPO (serial-in-parallel-out) register 24a, a PISO (parallel-in-serial-out) register 24b, and a bi-directional I/O (input/output) buffer (three-state I/O buffer) 24c.

The operation of different parts of the data saving/restoration control portion 2 configured as described above and register data saving/restoring operation using the same will be described later in detail.

The non-volatile memory 3 is a storage that can retain the storage contents even if power is shut down. In the data processing apparatus of this embodiment, FeRAM (ferroelectric RAM: 256 Kb=32 Kb×8) that stores register data in a non-volatile manner by exploiting ferroelectric hysteresis is used.

Next, with reference to FIG. 3, register data saving operation performed in the data processing apparatus configured as described above will be described in detail.

Figure 3:
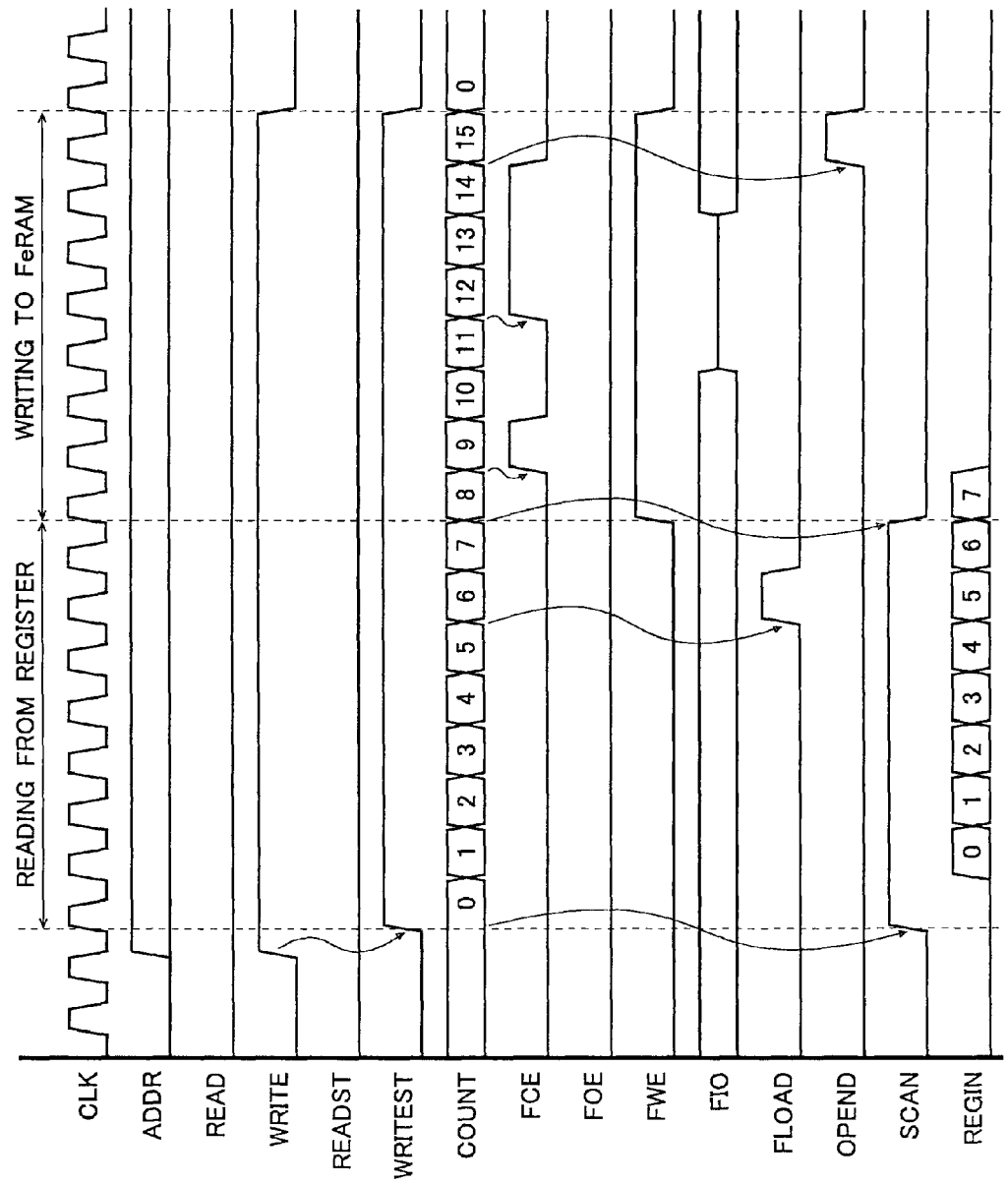
FIG. 3 is a timing chart illustrating data saving operation.

FIG. 3 is a timing chart illustrating register data saving operation.

As shown in FIG. 2 described above, when the reset signal RST has risen to a high level at shutdown upon detection of a fall in the source voltage VDD, the operation mode control portion 21 disables the normal enable signal NE (not shown in FIG. 3) so as to switch the registers 11 to 13 of the electronic circuit portion 1 to the shift register configuration, and gives instructions to the sequence control portion 22 to save data. Specifically, the operation mode control portion 21 inputs to the sequence control portion 22 an address signal ADDR indicating a write destination address of register data, and enables a write signal WRITE (in this embodiment, turns it to a high level) instructing register data to be written to the non-volatile memory 3.

In the sequence control portion 22 that has received the data save instructions, a write flag WRITEST indicating that the writing of register data to the non-volatile memory 3 has been instructed is set. During the interval that the write flag WRITEST is set, the address generating portion 25 is ready to generate a write destination address of register data, and the read/write control portion 26 is ready to perform the writing to the non-volatile memory 3.

In the sequence control portion 22, a sequence control counter COUNT used for timing control of the reading of data from the electronic circuit portion 1 and the writing of data to the non-volatile memory 3 counts up in synchronism with a positive edge of a clock signal CLK. That is, the data processing apparatus of this embodiment controls the register data saving operation as a state machine based on the count value of the sequence control counter COUNT.

In addition, the sequence control portion 22 gives instructions to the data scanning control portion 23 to perform data scanning (reading of register data) on the registers 11 to 13 by using the scan path. Specifically, the sequence control portion 22 enables a data scanning control signal SCAN (in this embodiment, turns it to a high level) enabling/disabling the operation of the data scanning control portion 23. The data scanning control signal SCAN is in an enabled state for the duration of the time the sequence control counter COUNT is counting up from "0" to "7".

Upon receipt of the instructions to perform data scanning by using the scan path, the data scanning control portion 23 sends a scan enable signal SE eight times, thereby giving instructions to the SIPO register 24a to read data of the registers 11 to 13 eight bits at a time. As a result, 8 bits of data (in this embodiment, one register's worth of data) is stored in the SIPO register 24a (see SIPO input data REGIN shown in the figure).

On the other hand, when the sequence control counter COUNT counts up to "6", a load signal FLOAD rises, and preparations for the reading of the register data stored in the SIPO register 24a begins.

After the completion of the storage of data in the SIPO register 24a, control is shifted to the writing of register data to the non-volatile memory 3 based on a chip enable signal FCE, an output enable signal FOE, and a write enable signal FWE.

The chip enable signal FCE is enabled to permit access to the non-volatile memory 3, and is disabled to prohibit access to the non-volatile memory 3. The chip enable signal FCE transitions into an enabled state by using its negative edge as a trigger, and transitions into a disabled state by using its positive edge as a trigger. In the case shown in FIG. 3, the chip enable signal FCE rises to a high level when the sequence control counter COUNT counts up to "9", and becomes ready for a negative edge (a transition into an enabled state). At the count of "10", the chip enable signal FCE drops to a low level, and transitions into an enabled state.

The output enable signal FOE is enabled when register data is read from the non-volatile memory 3, and is disabled when register data is written to the non-volatile memory 3. In the case shown in FIG. 3, the output enable signal FOE is kept in a disabled state (in this embodiment, at a low level).

Unlike the output enable signal FOE, the write enable signal FWE is disabled when register data is read from the non-volatile memory 3, and is enabled when register data is written to the non-volatile memory 3. In the case shown in FIG. 3, the write enable signal FWE is in an enabled state (in this embodiment, takes a high level) for the duration of the time the sequence control counter COUNT is counting up from "8" to "15".

The memory input/output signal FIO is a 8-bit parallel signal to be exchanged between the bi-directional I/O buffer 24c and the non-volatile memory 3. The data stored in the SIPO register 24a is sent out by using as a trigger a negative edge (a transition into an enabled state) of the chip enable signal FCE. In the data processing apparatus of this embodiment, when the sequence control counter COUNT counts up to "10", 8 bits of register data is transferred to the non-volatile memory 3 in a parallel manner via the bi-directional I/O buffer 24c.

Then, after being kept at a low level by two counts of the sequence control counter COUNT, the chip enable signal FCE is turned to a high level, and is then defaulted to a low level at the count of "15". It is to be noted that, as shown in FIG. 3, the logic state of the memory input/output signal FIO after the completion of the writing of register data may be indefinite.

Finally, an access termination signal OPEND rises when the sequence control counter COUNT counts up to "15". This indicates the completion of saving of one word of data.

As described above, in the data processing apparatus of this embodiment, based on the count value of the sequence control counter COUT, the following operation is repeatedly performed. With the first eight counts ("0" to "7"), 8 bits of register data is read from the electronic circuit portion 1; with the next eight counts ("8" to "15"), the read register data is written to the non-volatile memory 3.

When data scanning of the electronic circuit portion 1 is performed by using the scan path in the manner as described above, unnecessary data is overwritten one after another in the registers 11 to 13. This, however, poses no problem in restoring data since such unnecessary data is erased at shutdown.

Next, with reference to FIG. 4, restoration of register data in the data processing apparatus configured as described above will be described in detail.

Figure 4:
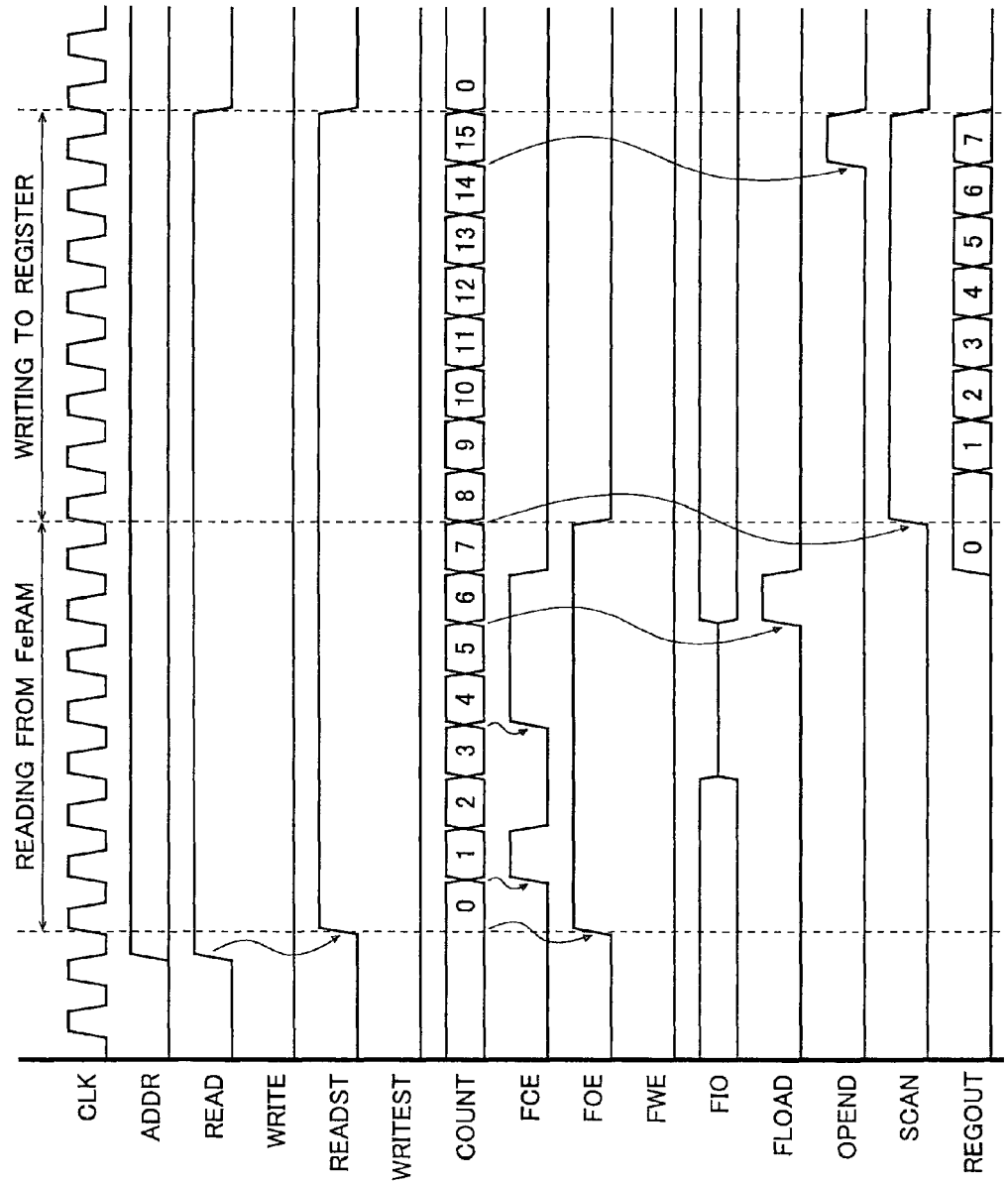
FIG. 4 is a timing chart illustrating data restoring operation.

FIG. 4 is a timing chart illustrating register data restoring operation.

As shown in FIG. 2 described above, when the reset signal RST has fallen to a low level at power-on upon detection of a rise in the source voltage VDD, the operation mode control portion 21 disables the normal enable signal NE (not shown in FIG. 4) so as to switch the registers 11 to 13 of the electronic circuit portion 1 to the shift register configuration, and gives instructions to the sequence control portion 22 to restore data. Specifically, the operation mode control portion 21 inputs to the sequence control portion 22 an address signal ADDR indicating a read destination address of register data, and enables a read signal READ (in this embodiment, turns it to a high level) instructing register data to be read from the non-volatile memory 3.

In the sequence control portion 22 that has received the data restoration instructions, a read flag READST indicating that the reading of register data from the non-volatile memory 3 has been instructed is set. During the interval that the read flag READST is set, the address generating portion 25 is ready to generate a read destination address of register data, and the read/write control portion 26 is ready to perform the reading from the non-volatile memory 3.

In the sequence control portion 22, a sequence control counter COUNT used for timing control of the reading of data from the non-volatile memory 3 and the writing of data to the electronic circuit portion 1 counts up in synchronism with a positive edge of a clock signal CLK. That is, the data processing apparatus of this embodiment controls the register data restoring operation as a state machine based on the count value of the sequence control counter COUNT.

When preparations to read register data from the non-volatile memory 3 are made, control is so performed that register data is read from the non-volatile memory 3 based on the chip enable signal FCE, the output enable signal FOE, and the write enable signal FWE.

In the case shown in FIG. 4, the chip enable signal FCE rises to a high level when the sequence control counter COUNT counts up to "1", and becomes ready for a negative edge (a transition into an enabled state). At the count of "2", the chip enable signal FCE drops to a low level, and transitions into an enabled state. The output enable signal FOE is in an enabled state (in this embodiment, at a high level) for the duration of the time the sequence control counter COUNT is counting up from "0" to "7". On the other hand, the write enable signal FWE is kept in a disabled state (in this embodiment, at a low level). As a result, in the data processing apparatus of this embodiment, when the sequence control counter COUNT counts up to "2", 8 bits of register data is transferred from the non-volatile memory 3 in a parallel manner via the bi-directional I/O buffer 24c.

When the sequence control counter COUNT counts up to "6", the load signal FLOAD rises, and the register data is stored in the PISO register 24b.

Then, after being kept at a low level by two counts of the sequence control counter COUNT, the chip enable signal FCE is turned to a high level, and is then defaulted to a low level at the count of "7". It is to be noted that, as shown in FIG. 4, the logic state of the memory input/output signal FIO after the completion of the reading of register data may be indefinite.

After the completion of the storage of data in the PISO register 24b, the sequence control portion 22 gives instructions to the data scanning control portion 23 to perform data scanning (writing of the saved register data) on the registers 11 to 13 by using the scan path. Specifically, the sequence control portion 22 enables the data scanning control signal SCAN (in this embodiment, turns it to a high level) enabling/disabling the operation of the data scanning control portion 23. The data scanning control signal SCAN is in an enabled state for the duration of the time the sequence control counter COUNT is counting up from "8" to "15".

Upon receipt of the instructions to perform data scanning by using the scan path, the data scanning control portion 23 sends the scan enable signal SE eight times, thereby giving instructions to the PISO register 24b to output data in a serial manner one bit at a time. As a result, 8 bits of data (in this embodiment, one register's worth of data) is restored to the registers 11 to 13 (see PISO output data REGOUT shown in the figure).

Finally, the access termination signal OPEND rises when the sequence control counter COUNT counts up to "15". This indicates the completion of restoration of one word of data.

As described above, in the data processing apparatus of this embodiment, the register data restoring operation is performed in reverse order to how the above-described saving operation is performed. That is, based on the count value of the sequence control counter COUT, the following operation is repeatedly performed. With the first eight counts ("0" to "7"), 8 bits of register data is read from the non-volatile memory 3; with the next eight counts ("8" to "15"), the read register data is written to the electronic circuit portion 1.

Next, with reference to FIGS. 5A, 5B, 6, and 7, an ingenious way of making a large-scale electronic circuit portion non-volatile will be described in detail.

Figure 5A:
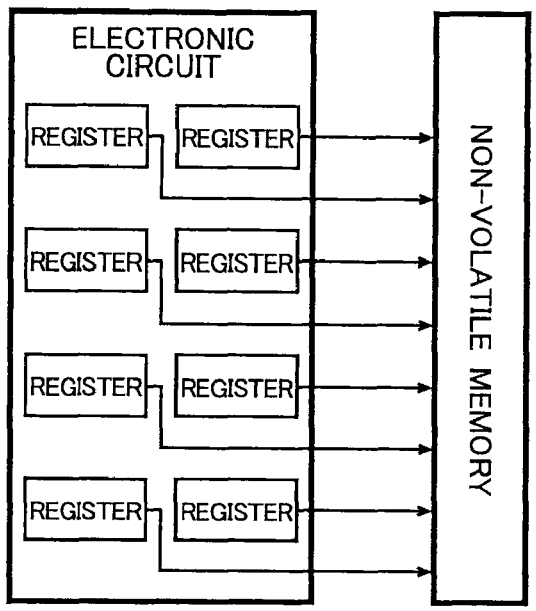
FIG. 5A is a block diagram showing a schematic configuration of a one-conductor-per-register type.
Figure 5B:
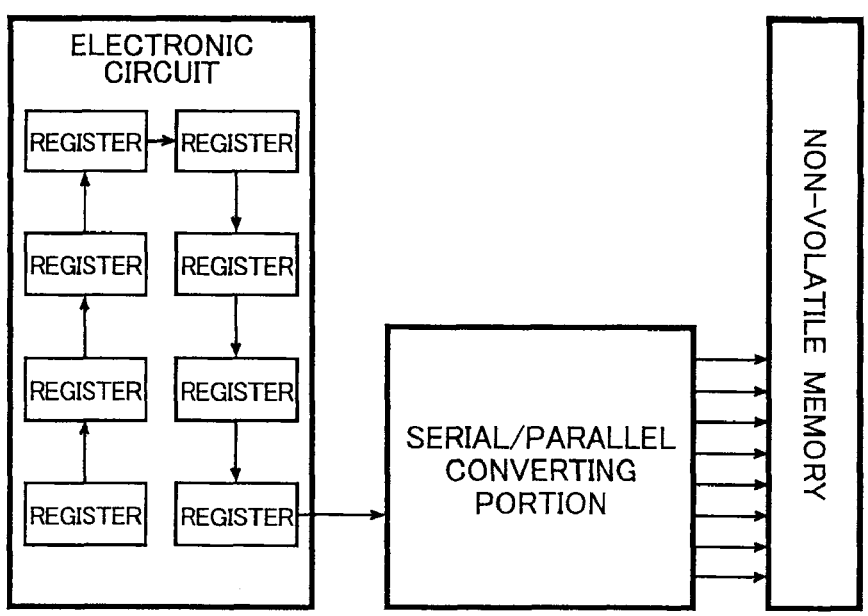
FIG. 5B is a block diagram showing a schematic configuration of a shift register-based.
Figure 6:
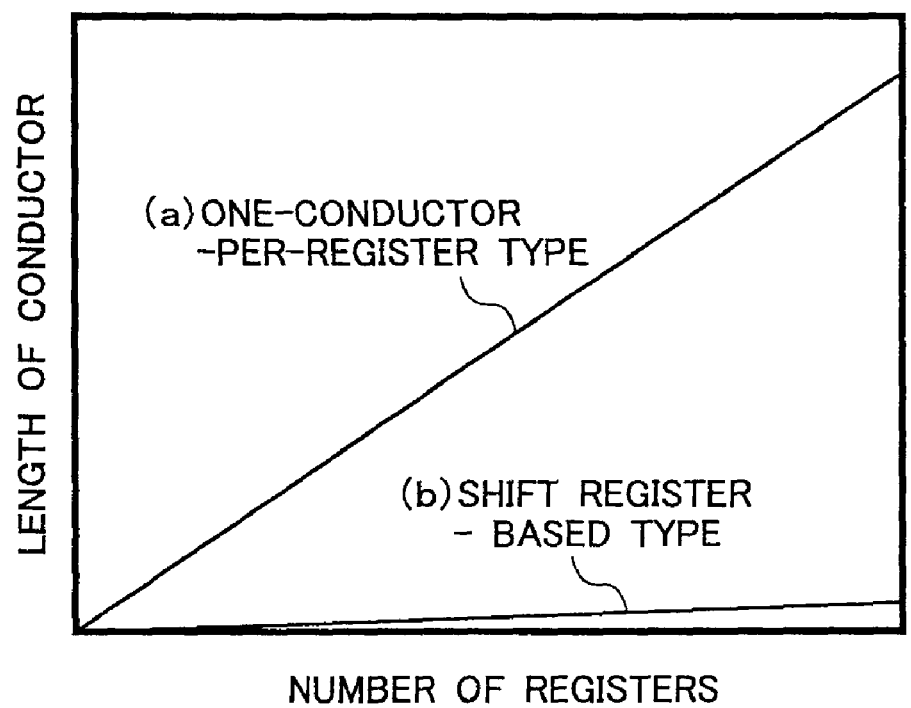
FIG. 6 is a diagram showing the relationship between the number of registers and the length of conductor.
Figure 7:
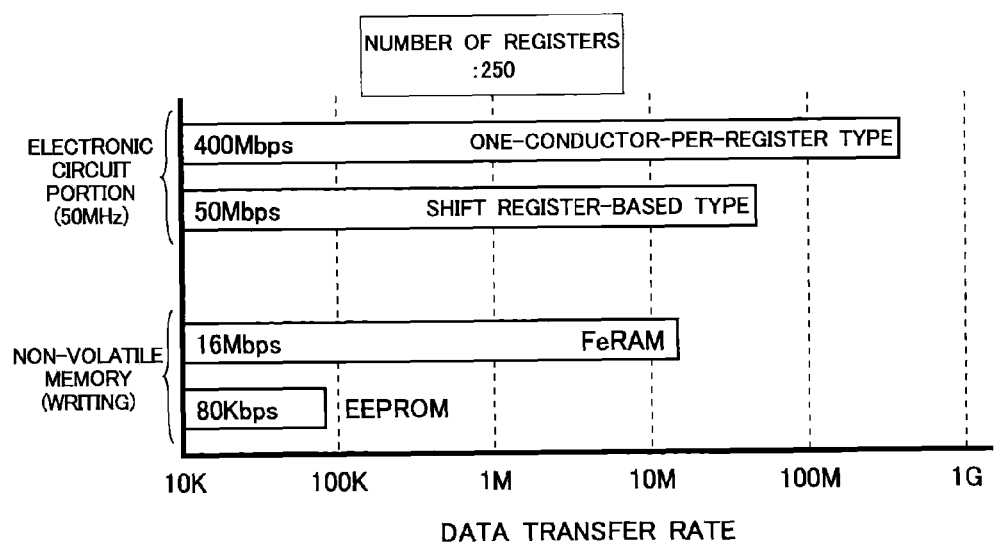
FIG. 7 is a diagram showing the data transfer rates of an electronic circuit portion and a non-volatile memory.

FIG. 5A is a block diagram showing a schematic configuration of a one-conductor-per-register type, and FIG. 5B is a block diagram showing a schematic configuration of a shift register-based type. FIG. 6 is a diagram showing the relationship between the number of registers and the length of conductor. FIG. 7 is a diagram showing the data transfer rates of an electronic circuit portion and a non-volatile memory.

As shown in FIG. 5A, adopting a configuration (a one-conductor-per-register type) in which a conductor for data saving is led out of each of a plurality of registers makes it possible to save register data at high speed. However, if this configuration is adopted, it is necessary to provide as many conductors and output ports as the registers. As a result, as indicated by reference character (a) shown in FIG. 6, the length of conductor for data saving increases with an increase in the size of an electronic circuit portion. This makes it difficult to apply this configuration to a large-scale electronic circuit portion.

By contrast, by adopting a configuration (a shift register-based type) in which, as shown in FIG. 5B, a plurality of registers are connected in serial and a conductor for data saving is led out of the register provided in the final stage, it is necessary simply to provide a conductor between the adjacent registers and a single output port, regardless of the number of registers. As a result, as indicated by reference character (b) shown in FIG. 6, the number of registers can be increased with little increase in the length of conductor. This makes it easy to apply this configuration to a large-scale electronic circuit portion.

For example, consider a case in which registers are arranged at regular intervals in a logic block that measures 1 mm per side. In this case, while the one-conductor-per-register type requires a conductor length of about 500 mm, the shift register-based type requires only one tenth or less (about 30 mm) of that conductor length.

In particular, since a CPU or the like having a scan path function is provided with a serial output port, the present invention can be applied thereto without affecting its existing logic through the use of that serial output port.

As far as a data transfer rate is concerned, the one-conductor-per-register type is faster than the shift register-based type. For example, as shown in FIG. 7, the data transfer rate of a CPU (Z80) operating at 50 MHz is about 400 Mbps for the one-conductor-per-register type and is 50 Mbps for the shift register-based type.

However, since a data transfer rate of the order of 1 Mbps is sufficient to save all the data of 250 registers used in the CPU (Z80), for example, within the data saving period (several hundreds microseconds (μs)) shown in FIG. 2, there are ample margins even if the shift register-based type is adopted. Accordingly, adopting the shift register-based type causes no problem at all.

On the other hand, it is necessary to use, as the non-volatile memory 3, a memory having the fastest possible data transfer rate. This makes an EEPROM, for example, having a data transfer rate of the order of 80 Kbps unsuitable for making a large-scale electronic circuit portion non-volatile. Thus, the data processing apparatus of this embodiment uses, as the non-volatile memory 3, an FeRAM having a data transfer rate of 16 Mbps. With this configuration, it is possible to save all the register data of the electronic circuit portion within the data saving period described above.

However, even if the FeRAM is used as the non-volatile memory 3, the data transfer rate thereof is much slower than that of the electronic circuit portion 1. As a result, if data is serially transferred from the electronic circuit portion 1 to the non-volatile memory 3 in a serial manner from beginning to end, the capability of saving the register data is determined by the data transfer rate of the non-volatile memory 3.

To avoid this, the data processing apparatus of this embodiment is provided with the serial/parallel converting portion 24 that performs, at the time of data saving, serial-to-parallel conversion on the register data inputted from the electronic circuit portion 1 in a serial manner and then outputs the data thus converted to the non-volatile memory 3, and that performs, at the time of data restoration, parallel-to-serial conversion on the register data inputted from the non-volatile memory 3 in a parallel manner and then outputs the data thus converted to the electronic circuit portion 1.

With this configuration, it is possible to read a plurality of pieces of register data from the electronic circuit portion 1 for each access to the non-volatile memory 3. This makes it possible to eliminate rate-determining conditions described above.

As described above, the data processing apparatus of this embodiment is so configured as to make the register data of the electronic circuit portion 1 virtually non-volatile by saving/restoring the register data (for data processing apparatuses using no volatile memory as a storage of data to be processed by the electronic circuit portion 1, all the data needed to restore the state of the electronic circuit portion 1) in an extremely short period (several hundreds microseconds (μs)) immediately after shutdown or power-on.

With this configuration, even if a sudden power shutdown such as a power failure occurs, it is possible to prevent loss of register data without the need for a sub power source or data backup operation during normal operation. This helps eliminate the occurrence of problems such as waste of working time.

For example, by applying the present invention to network servers (network management systems), they are allowed to maintain a processing state even during a power failure and resume processing after power is restored. This makes the network servers unaffected by a sudden power failure.

Alternatively, in the case of data processing apparatuses that need software control, such as personal computers, they are allowed to restore, at power-on, the register data of the electronic circuit portion to the state at shutdown. This helps greatly shorten the start-up time required by the hardware when software is reloaded, for example. This makes it possible to provide an environment in which the user can use the personal computer with ease as if he/she were using a home appliance such as a television set. Furthermore, the data processing apparatus of this embodiment can be turned on/off at very close intervals of the order of a few seconds without placing stress on the user. This makes it possible to reduce power consumption by shutting down the power whenever possible when detecting that the electronic circuit portion has entered a standby state.

For example, by applying the present invention to desktop personal computers or stationary game machines, it is possible to start up or activate them instantaneously. This eliminates the need to save data or wait for activation, making it possible to provide a stress-free IT environment.

Moreover, applying the present invention to notebook-size personal computers or mobile devices eliminates the need for battery backup. This makes it possible to retain data without any problem for several months even if the battery is fully discharged.

The invention may be practiced in any other manner than specifically described above, with any modification or variation made within the spirit of the invention.

For example, the embodiment described above deals with a configuration in which an FeRAM is used as the non-volatile memory 3. However, the present invention is not limited to this specific configuration. It is also possible to use, as the non-volatile memory 3, an MRAM (magnetroresistive RAM) that is a non-volatile memory storing register data by using the magnetroresistive effect of a magnetic substance, or a PRAM (phase change RAM) that is a non-volatile memory storing register data by using the phase change of a device.

Although the MRAM transfers data at a faster rate (about eight times) than the FeRAM, it requires a larger amount of power than the FeRAM. This results in a faster drop in the source voltage VDD of the MRAM. Consequently, it should be noted that, in a case where the MRAM is used as the non-volatile memory 3, the amount of time that can be spent on data saving is reduced.

On the other hand, although the data transfer rate of the PRAM is about the same as or slightly slower than the FeRAM, the restrictions on the number of times the PRAM can be rewritten are tighter than the restrictions on the number of times the FeRAM can be rewritten. Consequently, it should be noted that, in a case where the PRAM is used as the non-volatile memory 3, the useful life thereof is decreased.

Next, as an application of the invention described above, with reference to FIGS. 8A and 8B, a technique for constructing a system that can easily achieve enhancement of the usability of electronic circuits and a reduction in standby power consumption at lower cost, by using, in addition to the existing electronic circuits (such as ICs, LSIs, and IP cores that have already been introduced commercially), a data control circuit having a register data saving/restoration control function will be described in detail.

Figure 8B:
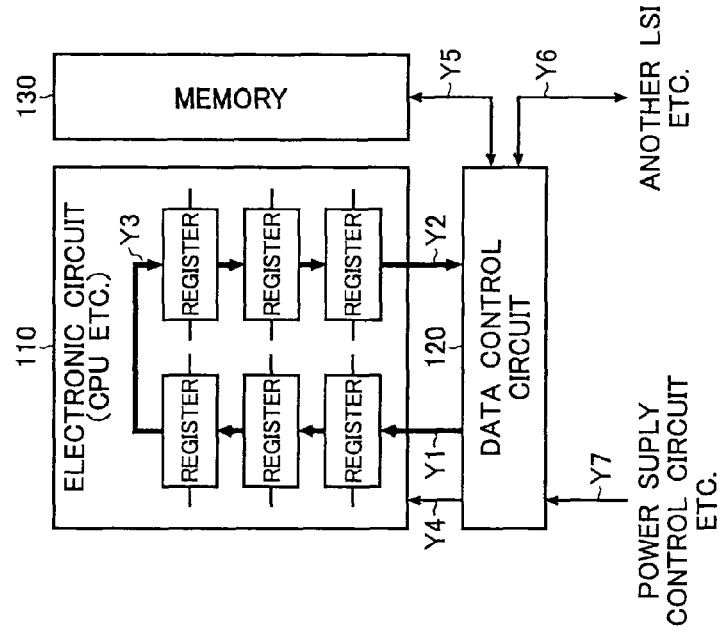
FIG. 8B is a block diagram showing another example of the configuration (the on-on-board-system configuration) of a system on which the data control circuit according to the invention is mounted.
Figure 8A:
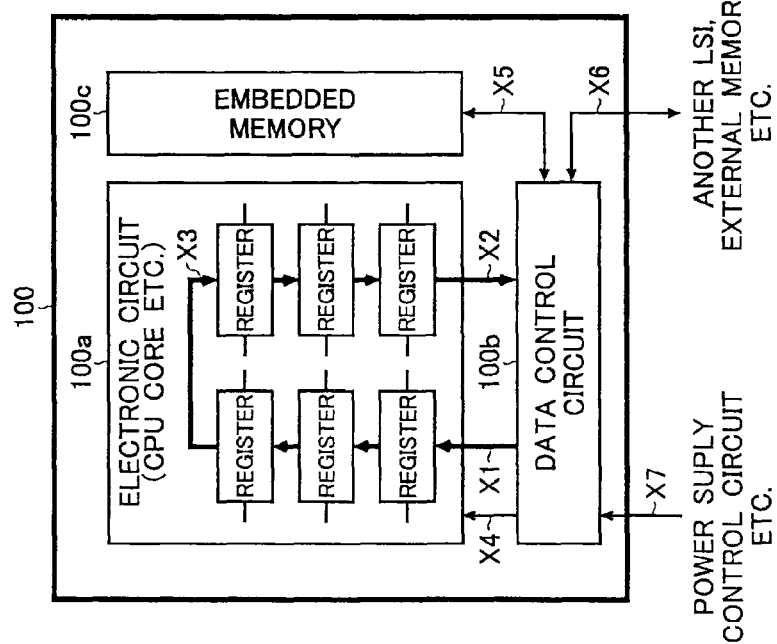
FIG. 8A is a block diagram showing an example of the configuration (the SoC configuration) of a system on which the data control circuit according to the invention is mounted.

FIG. 8A is a block diagram showing an example of the configuration (the SoC (system-on-chip) configuration) of a system on which the data control circuit according to the invention is mounted, and FIG. 8B is a block diagram showing another example of the configuration (the on-board-system configuration) of a system on which the data control circuit according to the invention is mounted.

In the data processing apparatus having the SoC configuration shown in FIG. 8A, a system LSI (SoC) 100 is composed of an electronic circuit 100*a* (such as a CPU core), a data control circuit 100*b*, and an embedded memory 100*c*, which are integrated into a single chip.

The electronic circuit 100*a* corresponds to the electronic circuit portion 1 shown in FIG. 1, and has a register data input port and a register data output port (a debug port such as a scan path or the like) that are used for making access to the registers provided in the circuit from outside the circuit.

The data control circuit 100*b* corresponds to the data saving/restoration control portion 2 shown in FIG. 1, and has a data saving control function of saving the register data of the electronic circuit 100*a* to the outside of the circuit via the register data output port of the electronic circuit 100*a*. Also, the data control circuit 100*b* has a data restoration control function of restoring the register data saved to the outside of the electronic circuit 100*a* to the registers provided in the circuit via the register data input port of the electronic circuit 100*a*.

The embedded memory 100*c* corresponds to the non-volatile memory 3 shown in FIG. 1, and is a storage circuit to which the register data read from the electronic circuit 100*a* is saved.

In FIG. 8A, reference character X1 represents a serial signal (corresponding to the serial signal SI shown in FIG. 1) to be fed to the registers of the electronic circuit 100*a* from the data control circuit 100*b* via the register data input port. Reference character X2 represents a serial signal (corresponding to the serial signal SO shown in FIG. 1) read from the registers of the electronic circuit 100*a* to the data control circuit 100*b* via the register data output port. Reference character X3 represents an input/output path (a debug line such as a scan path or the like) of the serial signal in the electronic circuit 100*a*. The scan path may be formed optionally at the time of integration of circuits of the CMOS core. Reference character X4 represents a scan path enable signal (corresponding to the scan path enable signal SE shown in FIG. 1). Reference character X5 represents an internal memory bus for input and output of the register data between the data control circuit 100*b* and the embedded memory 100*c*. Reference character X6 represents an external bus for input and output of the register data between the data control circuit 100*b* and another LSI, an external memory or the like. Reference character X7 represents a data control signal (a trigger signal for controlling saving/restoration of the register data) inputted from the power supply control circuit or the like.

On the other hand, in the data processing apparatus having the on-board-system configuration shown in FIG. 8B, an electronic circuit 110 (such as a CPU), a data control circuit 120, and a memory 130 are integrated into different chips, and individually mounted on the mother board.

The electronic circuit 110 corresponds to the electronic circuit portion 1 shown in FIG. 1, and has a register data input port and a register data output port that are used for making access to the registers provided in the circuit from outside the circuit.

The data control circuit 120 corresponds to the data saving/restoration control portion 2 shown in FIG. 1, and has a data saving control function of saving the register data of the electronic circuit 110 to the outside of the circuit via the register data output port of the electronic circuit 110. Also, the data control circuit 120 has a data restoration control function of restoring the register data saved to the outside of the electronic circuit 110 to the registers provided in the circuit via the register data input port of the electronic circuit 110.

The memory 130 corresponds to the non-volatile memory 3 shown in FIG. 1, and is a storage circuit to which the register data read from the electronic circuit 110 is saved.

In FIG. 8B, reference character Y1 represents a serial signal (corresponding to the serial signal S1 shown in FIG. 1) to be fed to the registers of the electronic circuit 110 from the data control circuit 120 via the register data input port. Reference character Y2 represents a serial signal (corresponding to the serial signal SO shown in FIG. 1) read from the registers of the electronic circuit 110 to the data control circuit 120 via the register data output port. Reference character Y3 represents an input/output path (a debug line such as a scan path or JTAG) of the serial signal in the electronic circuit 110. Reference character Y4 represents a scan path enable signal or a JTAG control signal (corresponding to the scan path enable signal SE shown I n FIG. 1). Reference character Y5 represents a memory bus for input and output of the register data between the data control circuit 120 and the memory 130. Reference character Y6 represents a data bus for input and output of the register data between the data control circuit 120 and another LSI or the like. Reference character Y7 represents a data control signal (a trigger signal for controlling saving/restoration of the register data) inputted from the power supply control circuit or the like.

As described above, by using, in addition to the existing electronic circuits 100a and 110 (such as ICs, LSIs, and IP cores that have already been introduced commercially), the data control circuits 100b and 120 having a register data saving/restoration control function, and by making effective use of the design assets of the electronic circuits 100a and 110 without making major changes therein, it is possible to achieve enhancement of the usability of the electronic circuit 100a and 110 and a reduction in standby power consumption in a short development period and at lower cost.

Next, with reference to FIGS. 9 and 10, an application to the retention of data at power-on/shutdown will be described in detail.

Figure 9:
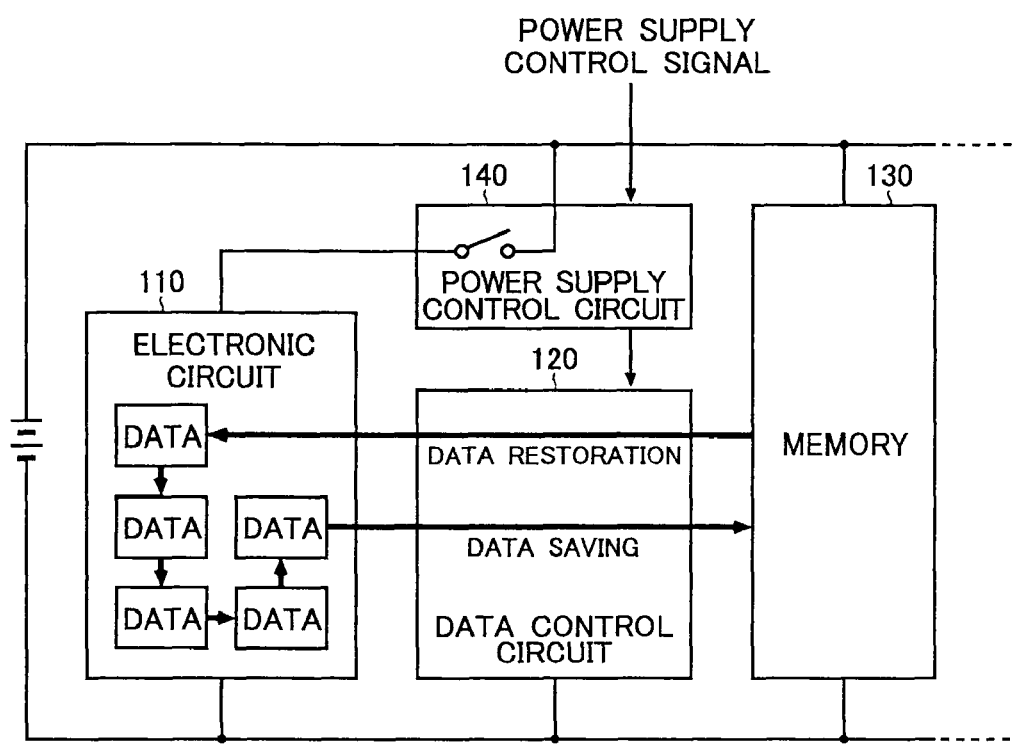
FIG. 9 is a block diagram showing an example of the configuration for achieving the retention of data at power-on/shutdown.
Figure 10:
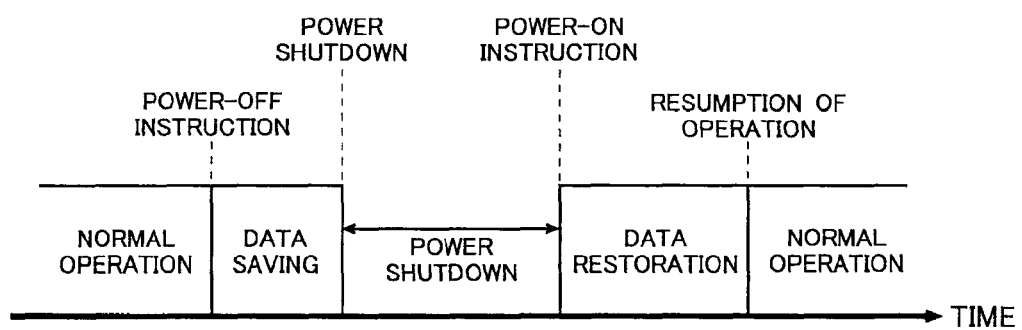
FIG. 10 is a time chart showing an example of data retaining operation.

FIG. 9 is a block diagram showing an example of the configuration for achieving the retention of data at power-on/shutdown, and FIG. 10 is a time chart showing an example of data retaining operation.

The data control circuit 120 checks whether power to the electronic circuit 110 is turned on or shut down (in the example shown in FIG. 9, checks a power supply control signal inputted from outside via the power supply control circuit 140). If instructions are given to turn the power off, the data control circuit 120 saves the register data of the electronic circuit 110; if instructions are given to turn the power on, the data control circuit 120 restores the saved register data to the registers of the electronic circuit 110, so as to restore the state of the electronic circuit 110.

Thus, if instructions are given to turn the power off during normal operation, the register data of the electronic circuit 110 is saved to the memory 130, and then the power is shut down. After this, if instructions are given to turn the power on, the register data saved to the memory 130 is restored to the electronic circuit 110, and then the electronic circuit 110 resumes normal operation (see FIG. 10).

With this configuration, it is possible to prevent loss of register data due to a power shutdown. This makes it possible to restore the electronic circuit 110 to the state before power shutdown shortly after the power is turned on again, and shorten the start-up time required by the hardware when software is reloaded, for example. As a result, it is possible to provide an environment in which the user can use the personal computer with ease as if he/she were using a home appliance such as a television set.

Alternatively, as described above, by exploiting the discharging time of the source voltage, the register data of the electronic circuit 110 may be saved to the memory 130 within the period after a fall in the source voltage is detected until the source voltage falls down to the lower limit voltage at which the apparatus is guaranteed to operate. With this configuration, there is no need to use a sub power source (such as a UPS or a battery backup) in performing data saving, making it possible to cope with a sudden power failure. In addition, unlike a configuration in which register data backup operation is performed during normal operation, the processing speed of the electronic circuit 110 is unaffected.

Next, an application to achieving a reduction in power consumption by a power shutdown during standby will be described in detail.

Figure 11A:
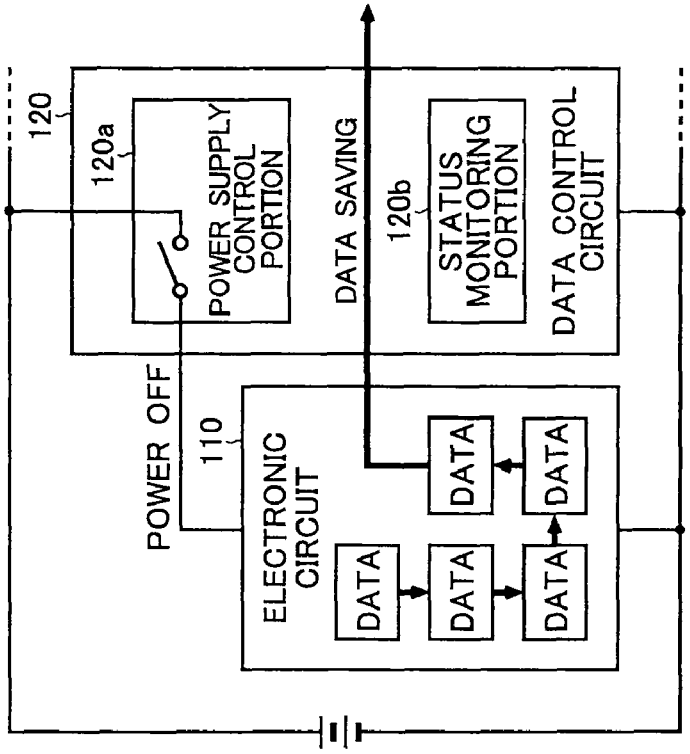
FIG. 11A is a block diagram showing an example of the configuration (at the time of data restoration) for achieving a reduction in power consumption by a power shutdown during standby.
Figure 11B:
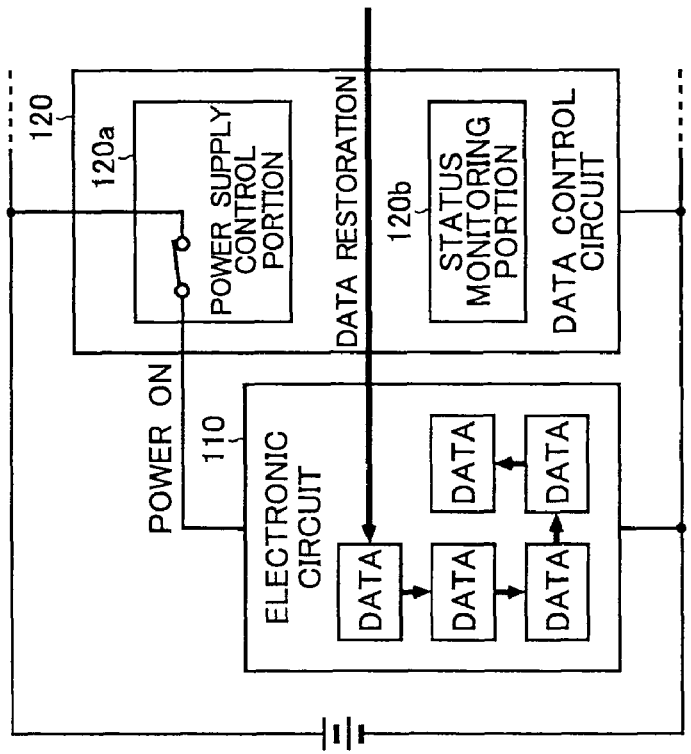
FIG. 11B is a block diagram showing the example of the configuration (at the time of data saving) for achieving a reduction in power consumption by a power shutdown during standby.

FIGS. 11A and 11B are block diagrams showing an example of the configuration (at the time of data restoration and data saving, respectively) for achieving a reduction in power consumption by a power shutdown during standby.

As shown in FIGS. 11A and 11B, the data control circuit 120 of this configuration example includes a power supply control portion 120a that controls a turn-on/shutdown of power to the electronic circuit 110, and a status monitoring portion 120b that monitors the operating status of the electronic circuit 110. If the electronic circuit 110 has entered a standby state, the data control circuit 120 saves the register data and shuts down the power to the electronic circuit 110; if the electronic circuit 110 has to be restored from the standby state, the data control circuit 120 turns on the power to the electronic circuit 110 and restores the register data.

With this configuration, it is possible to automatically control a power turn-on/shutdown in accordance with the operating status of the electronic circuit 110 while retaining the register data thereof. This makes it possible to reduce standby leakage power.

Figure 12:
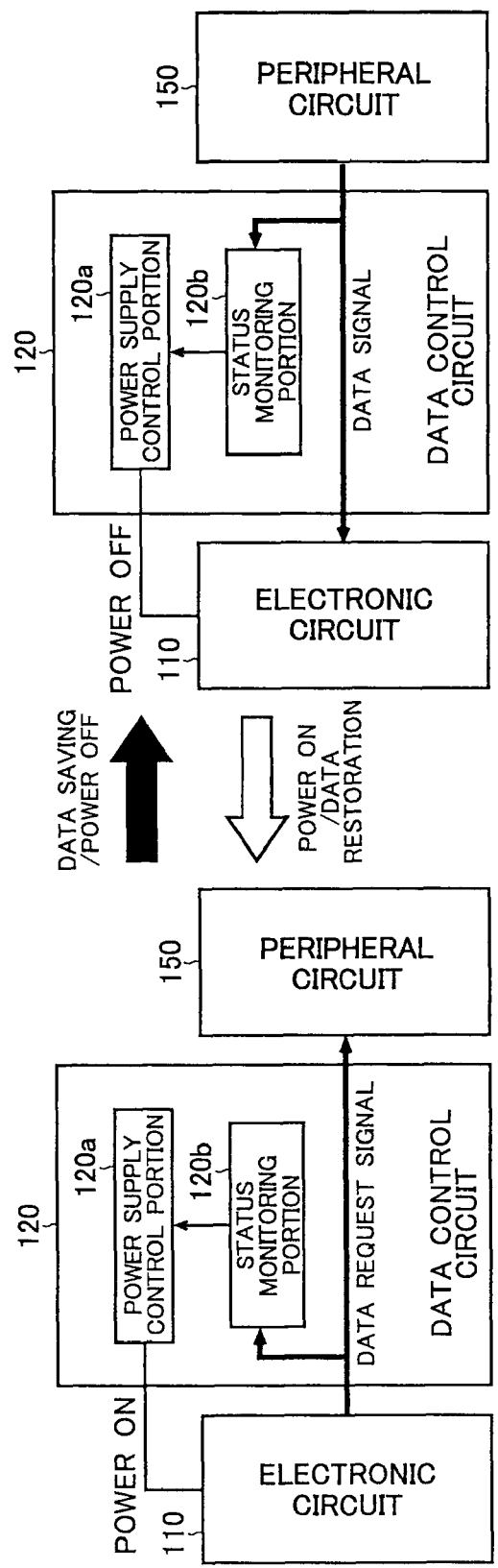
FIG. 12 is a block diagram showing an example of the configuration for detecting an operating status of an electronic circuit 110 by using a status monitoring portion 120*b*.

FIG. 12 is a block diagram showing an example of the configuration for detecting an operating status of the electronic circuit 110 by using the status monitoring portion 120b.

As shown in FIG. 12, in the data control circuit 120 of this configuration example, the status monitoring portion 120b monitors an input/output signal exchanged between the electronic circuit 110 and a peripheral circuit 150, and checks the operating status of the electronic circuit 110.

More specifically, when a data request signal is sent from the electronic circuit 110 to the peripheral circuit 150, the status monitoring portion 120b detects that the electronic circuit 110 has entered a standby state (a state in which external information from the peripheral circuit 150 is waited for); when a response signal (a data signal) is sent from the peripheral circuit 150 to the electronic circuit 110, the status monitoring portion 120b detects that the electronic circuit 110 has to be restored from the standby state.

With this configuration, it is possible to save the register data and shut down the power even during a high-speed data transfer, as long as there is the time when the electronic circuit 110 is in a standby state for as short as a few milliseconds. This makes it possible to reduce power consumption by turning the power on/off as often as possible.

Figure 13A:
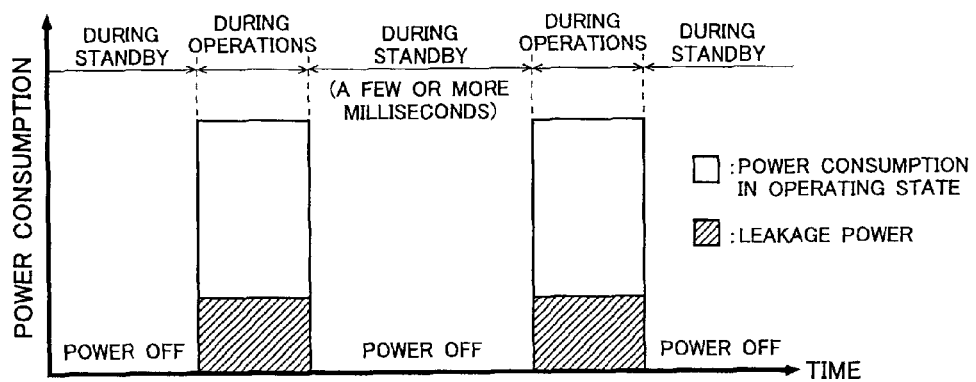
FIG. 13A is a diagram showing a power consumption behavior of the present invention.
Figure 13B:
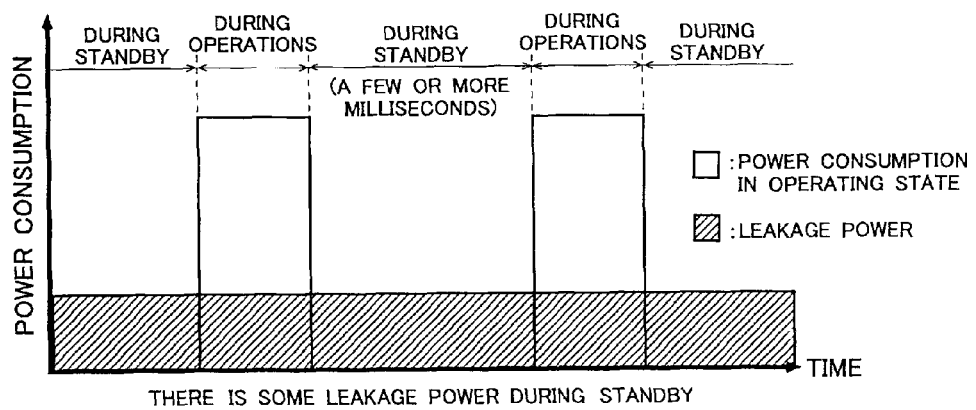
FIG. 13B is a diagram showing a conventional power consumption behavior.

FIGS. 13A and 13B are diagrams illustrating how effective the present invention is in reducing leakage power. FIG. 13A is a diagram showing a power consumption behavior of the present invention, and FIG. 13B is a diagram showing a power consumption behavior of a conventional configuration. In FIGS. 13A and 13B, the vertical axis represents power consumption, and the horizontal axis represents time.

As shown in FIG. 13B, in the conventional configuration, there is some leakage power not only during operation but also during standby (see a hatched portion in the figure). By contrast, as shown in FIG. 13A, since the configuration of the present invention can save the register data and shut down the power during standby, it is possible to reduce power consumption.

In particular, the proportion of leakage power to the total power consumption tends to increase as the technology node (the ground rules of the semiconductor process defined by the ITRS (International Technology Roadmap for Semiconductors)) of the device decreases. Thus, reduction in standby leakage power is undoubtedly very important in achieving the miniaturization of the device.

Figure 14:
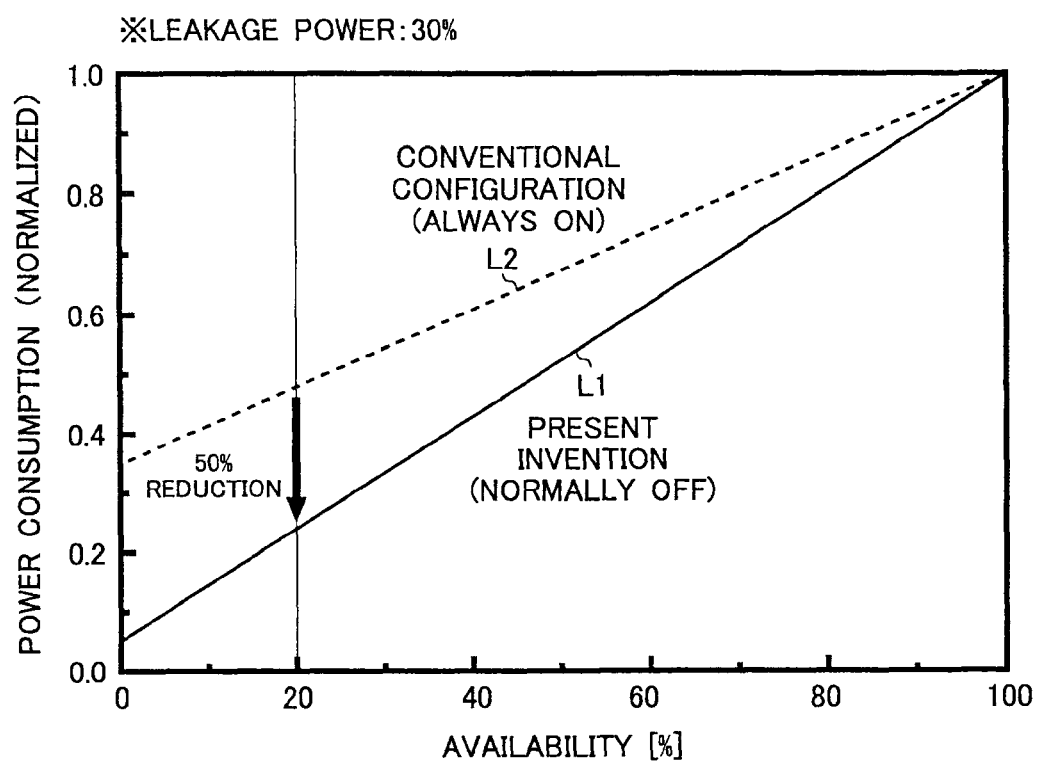
FIG. 14 is a diagram illustrating how effective the present invention is in reducing power consumption of the device as a whole.

FIG. 14 is a diagram illustrating how effective the present invention is in reducing power consumption of the device as a whole. In this figure, the vertical axis represents power consumption (normalized) of the device, and the horizontal axis represents the availability (%) of the device. It is to be noted that this figure deals with a case in which the proportion of leakage power to the total power consumption is 30%.

As will be understood from a comparison between a solid line L1 (present invention: normally off) and a dashed line L2 (conventional configuration: always on), the lower the availability of the device, the greater the standby leakage power reduction effect. If the availability is 20%, it is possible to reduce the total power consumption by approximately 50%.

Next, an application to process switching by replacement of register data will be described in detail.

Figure 15:
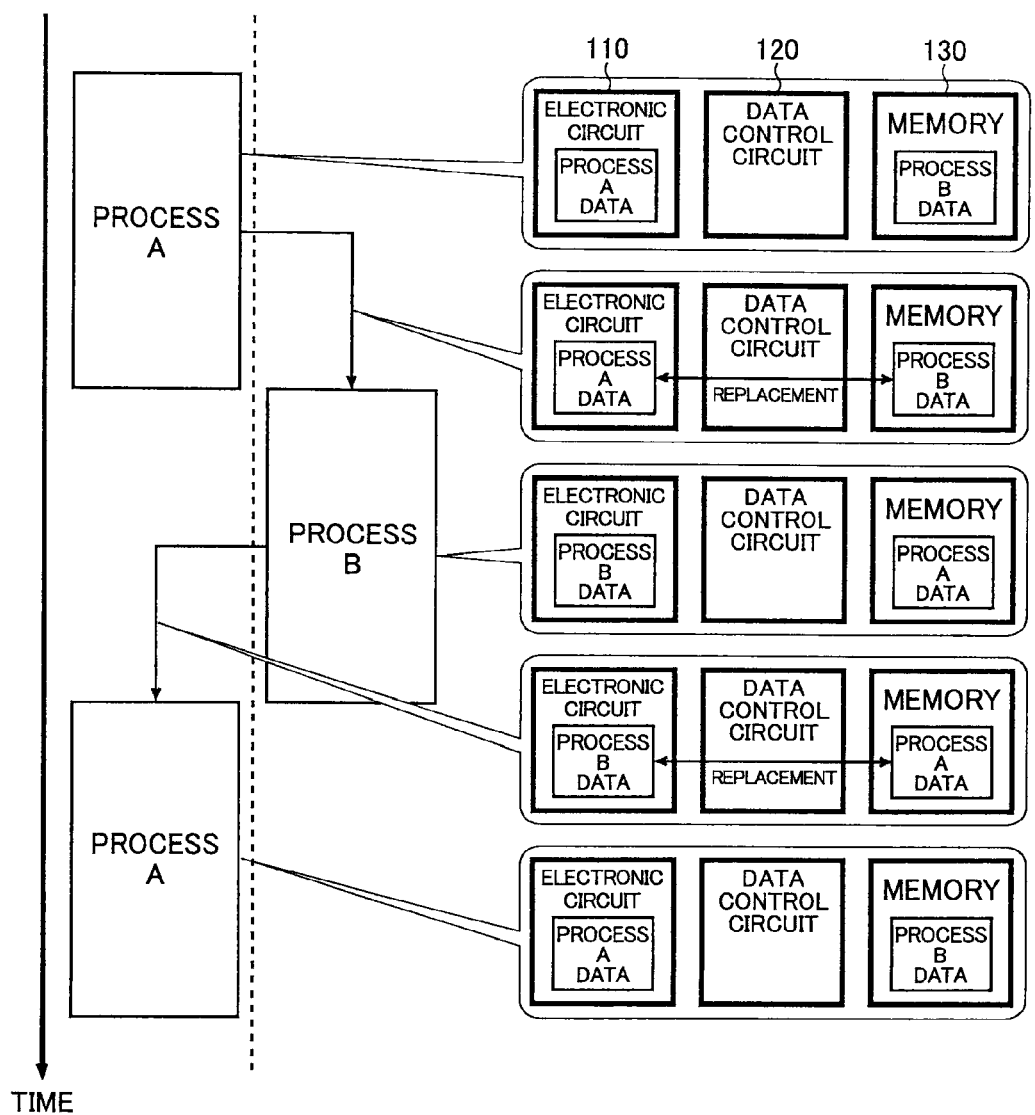
FIG. 15 is a block diagram showing an example of the configuration for achieving process switching by replacement of register data.

FIG. 15 is a block diagram showing an example of the configuration for achieving process switching by replacement of register data.

As shown in this figure, the data control circuit 120 of this configuration example performs replacement of register data depending on a process to be executed by the electronic circuit 110. More specifically, if a process to be executed by the electronic circuit 110 is switched from process A to process B, the data control circuit 120 temporarily saves the register data (process A data) stored in the electronic circuit 110 that is currently executing the process A to the memory 130 from the electronic circuit 110, and restores the register data (process B data) that has been saved to the memory 130 at the time of execution of the process B to the electronic circuit 110. In this way, all the register data of the electronic circuit 110 is replaced with another register data. This helps switch a process to be executed without initializing the electronic circuit 110. Incidentally, a process to be executed by the electronic circuit 110 can be switched from process B to process A by doing the above-described procedure the other way around.

With this configuration, even if there is a need to suspend one process and start another process from where the one process was suspended, it is possible to achieve process switching through the use of the hardware alone. This makes it possible to achieve faster process switching than when the software is used.

Figure 16:
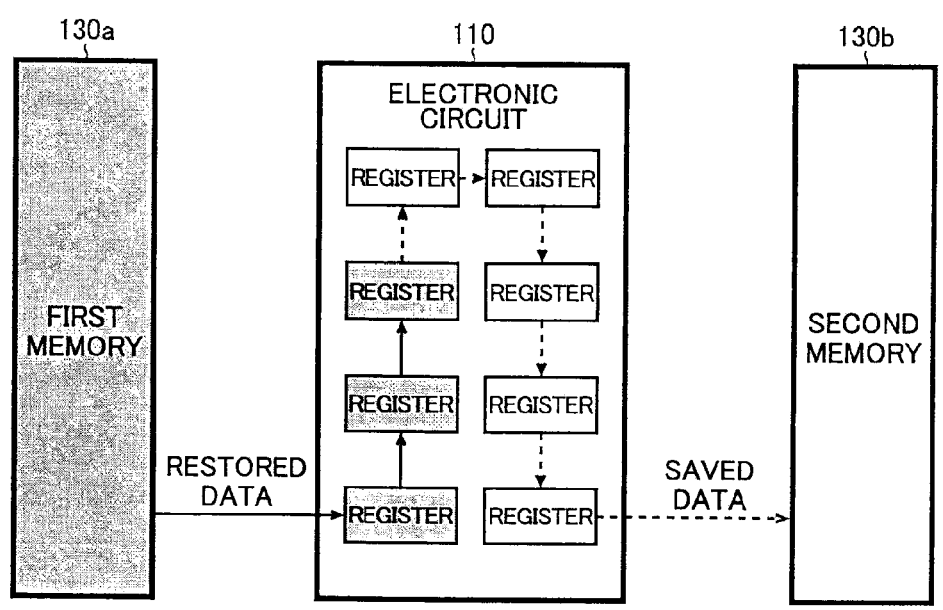
FIG. 16 is a block diagram showing an example of the configuration for achieving the concurrent execution of data saving and data restoration.

As shown in FIG. 16, the data control circuit 120 of the configuration example described above may perform data saving operation and data restoring operation simultaneously when performing replacement of the register data. More specifically, if a process to be executed by the electronic circuit 110 is switched from process A to process B, the data control circuit 120 inputs the register data (process B data) that has been saved to a first memory 130a at the time of execution of the process B to the electronic circuit 110 in a serial manner one bit at a time for restoring it, and saves the register data (process A data) in the electronic circuit 110, the register data being outputted therefrom one bit at a time as the process B data is restored, to a second memory 130b. In this way, all the register data of the electronic circuit 110 is replaced with another register data. In FIG. 16, restored data is represented by gray boxes and arrows with solid line, and saved data is represented by white boxes and arrows with dashed line.

With this configuration, it is possible to quickly complete the replacement of the register data, and hence process switching.

For the first and second memories 130a and 130b described above, they may be provided as separate chips, or provided as first and second memory areas 130a and 130b obtained by dividing a storage area of a dual-port memory.

Next, with reference to FIG. 17, a memory in use and the amount of transferred data will be described in detail.

Figure 17:
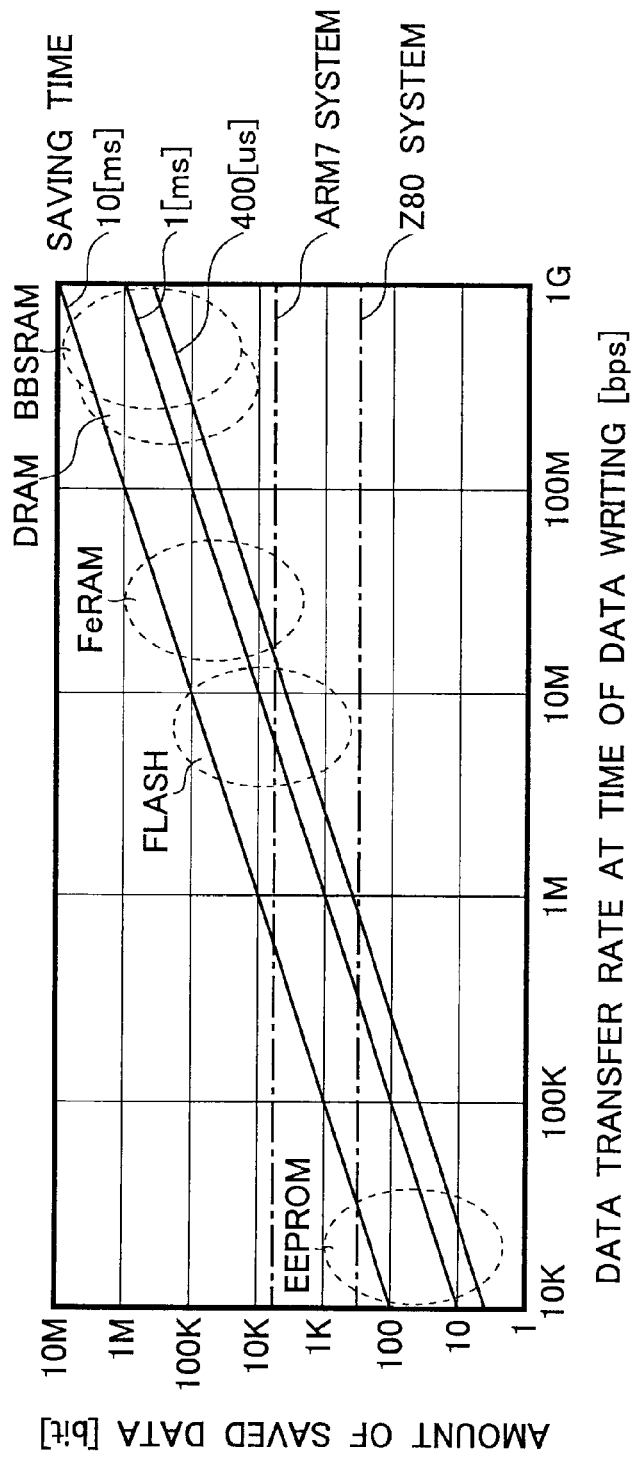
FIG. 17 is a diagram showing the relationship between a memory in use and the amount of transferred data.

FIG. 17 is a diagram showing the relationship between a memory in use and the amount of transferred data. In this figure, the vertical axis represents the amount of saved data, and the horizontal axis represents the data transfer rate at the time of data writing.

If a saving time of 10 ms or more can be secured for saving several hundred bits of register data (such as register data of the Z80 system), for example, it is possible to use an EEPROM as a destination memory to which data is saved. However, if there is a need to save a few Kbits of register data (register data of the ARM7 system) in a shorter time period (of the order of 1 ms), it is necessary to use a storage circuit that is faster than the EEPROM, such as a flash memory or an FeRAM.

That is, in the data processing apparatus of the present invention, with consideration given to the relationship between the amount of saved data and saving time, a storage circuit (an SRAM, a DRAM, an EEPROM, a flash memory, an FeRAM, an MRAM, a PRAM, an RRAM, an NVSRAM, a BBSRAM, and a memory of a similar kind, or a latch, a register, and a storage device of a similar kind) having a data transfer rate at which all the register data can be saved from the electronic circuit may be used, as appropriate, as a destination to which the register data is saved.

Next, with reference to FIG. 18, an application to achieving, through the use of the hardware, saving/restoration of not only register data of an electronic circuit but also data of a volatile memory that stores data to be processed by the electronic circuit will be described in detail.

Figure 18:
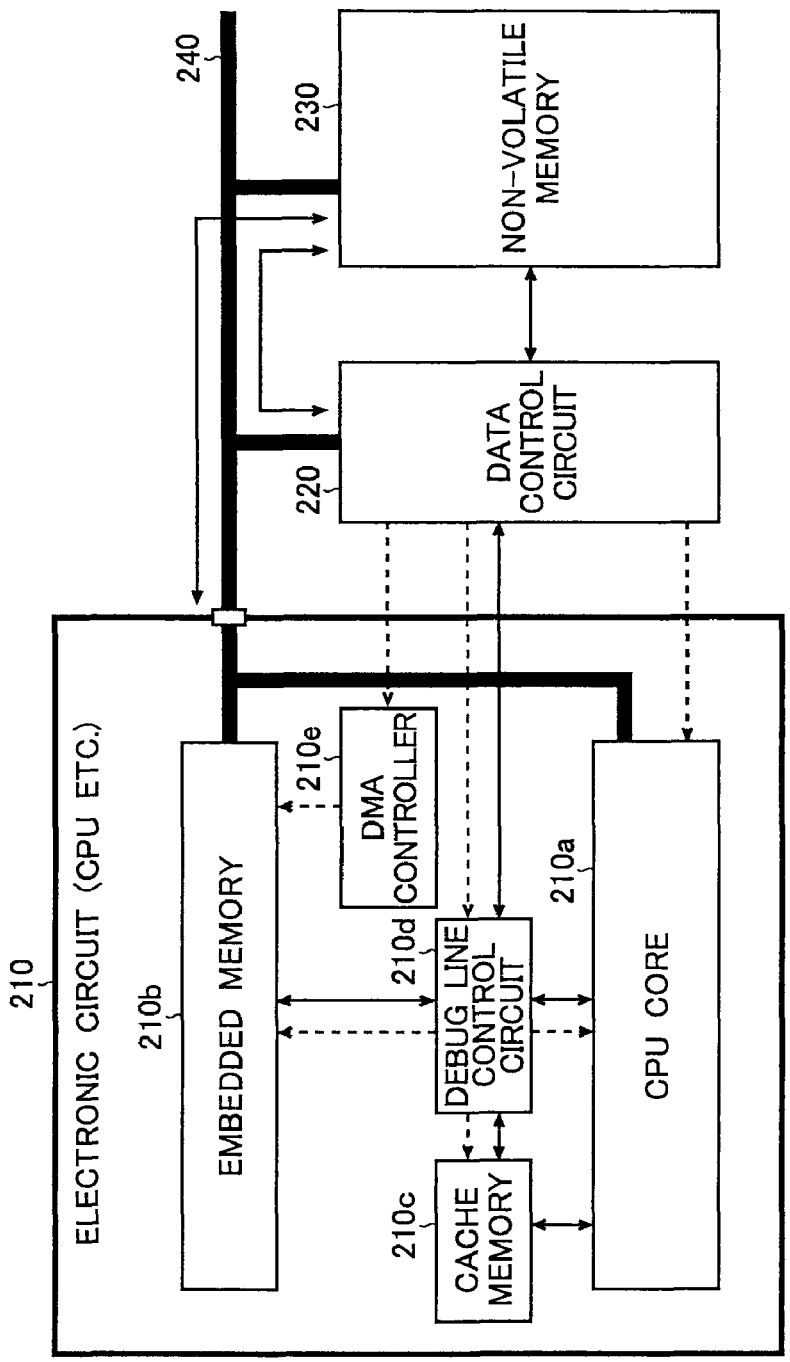
FIG. 18 is a block diagram showing an example of the configuration for achieving saving/restoration of data of a volatile memory storing data to be processed by the electronic circuit.

FIG. 18 is a block diagram showing an example of the configuration for achieving saving/restoration of data of a volatile memory that stores data to be processed by the electronic circuit. In this figure, arrows with solid line represent the data saving/restoring paths, and arrows with dashed line represent the control signal transmission paths.

As shown in FIG. 18, a data processing apparatus of this configuration example includes an electronic circuit 210 such as a large-scale CPU, a data control circuit 220, and a non-volatile memory 230. The above-described electronic circuit 210, data control circuit 220, and non-volatile memory 230 are each connected to a data bus 240.

The electronic circuit 210 corresponds to the electronic circuit 110 shown in FIG. 8B (or the electronic circuit 100 shown in FIG. 8A except for the data control circuit 100b), and includes, in addition to a CPU core 210a, an embedded memory 210b, a cache memory 210c, a debug line control circuit 210d, and a DMA (direct memory access) controller 210e.

The CPU core 210a, the embedded memory 210b, and the cache memory 210c each have a data input port and a data output port (a debug port such as a scan path or JTAG) that are used for making access to the storage devices provided in the circuit from outside the circuit. Such a debug port may be formed optionally at the time of circuit integration.

The embedded memory 210b and the cache memory 210c are volatile memories storing data to be processed by the electronic circuit 210. The example shown in FIG. 18 deals with a case in which the embedded memory 210b and the cache memory 210c are incorporated in the electronic circuit 210. This, however, is not meant to limit the configuration of the invention in any way. For example, the embedded memory 210b and the cache memory 210c may be added externally.

In addition to controlling saving/restoration of data between the CPU core 210a, the embedded memory 210b, and the cache memory 210c, and the data control circuit 220 via the debug port, and controlling saving/restoration of data therebetween via the data bus 240, the debug line control circuit 210d serves as an input/output path through which the saved/restored data is inputted/outputted via the debug port.

Based on the instructions from the data control circuit 220, the DMA controller 210e controls DMA transfer of the embedded memory 210b. The DMA controller 210e may be incorporated in the data control circuit 220.

The data control circuit 220 corresponds to the data control circuit 120 shown in FIG. 8B, and has a function of achieving, through the use of the hardware, saving/restoration of not only register data of the CPU core 210a forming the electronic circuit 210 but also data of a volatile memory (in FIG. 18, the embedded memory 210b and the cache memory 210c) storing data to be processed by the electronic circuit 210 (in FIG. 18, a function of making access to the CPU core 210a, to the embedded memory 210b, and to the cache memory 210c via the debug port, and a function of giving instructions to the DMA controller 210e to make the embedded memory 210b perform DMA transfer). As is the case with FIG. 8A, the data control circuit 220 can be incorporated in the electronic circuit 210.

The non-volatile memory 230 corresponds to the memory 130 shown in FIG. 8B, and is a storage circuit to which various data (register data, memory data, and cache data) read from the electronic circuit 210 is saved. As is the case with FIG. 8A, the non-volatile memory 230 can be incorporated in the electronic circuit 210.

As described above, as the non-volatile memory 230, a storage circuit (an SRAM, a DRAM, an EEPROM, a flash memory, an FeRAM, an MRAM, a PRAM, an RRAM, an NVSRAM, a BBSRAM, and a memory of a similar kind, or a latch, a register, and a storage device of a similar kind) may be used.

Alternatively, it is possible to adopt a configuration in which a non-volatile memory to which data is saved via the debug line and a non-volatile memory to which data is saved via the data bus 240 are provided separately.

Figure 19:
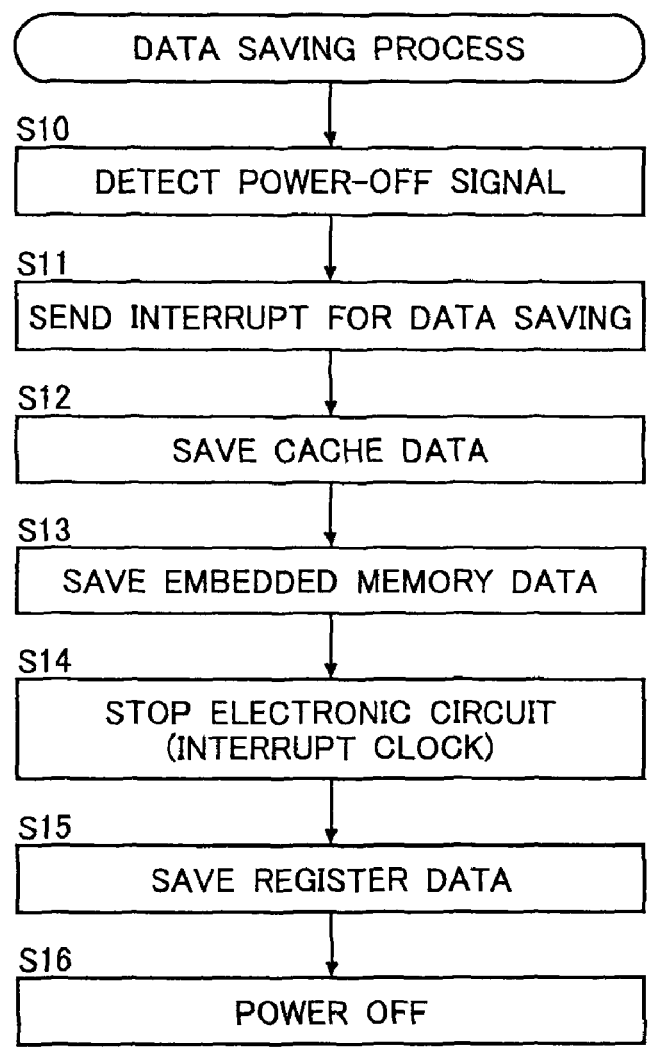
FIG. 19 is a flow chart showing an example of a data saving process.

With reference to FIG. 19 and also to FIG. 18 described above, a data saving process performed by the data processing apparatus configured as described above will be described.

FIG. 19 is a flow chart showing an example of a data saving process. FIG. 19 describes a case in which a data saving process is performed on the electronic circuit 210 by using as a trigger the issuance of power-off instructions. This, however, is not meant to limit the application of the invention in any way. It is needless to say that, as described above, a data saving process can be performed on the electronic circuit 210 by using as a trigger the detection of a standby state of the electronic circuit 210 or the detection of process switching.

First, if a signal indicating a power-off is detected in step S10, an interrupt is sent to the electronic circuit 210 from the data control circuit 220 in step S11, whereby a process being executed by the electronic circuit 210 is suspended. Then, in steps S12 and S13, saving of data of the cache memory 210c and saving of data of the embedded memory 210b are performed by the data control circuit 220 via the debug line or the data bus 240. In step S14, the data control circuit 220 interrupts a drive clock to the electronic circuit 210. After the operation of the CPU core 210a is stopped, in step S15, saving of the register data is performed via the debug line. After saving of all the data is completed, in step S16, the power to the electronic circuit 210 is turned off.

As is the case with saving of the register data of the CPU core 210a, for saving of data of the cache memory 210c performed in step S12 and saving of data of the embedded memory 210b performed in step S13, data may be saved via the debug line or the data bus 240 by controlling the cache memory 210c and the embedded memory 210b via the debug line. For data saving via the debug line, data may be saved from the data control circuit 220 to the non-volatile memory 230 by using the data bus 240 or a path through which the saved data is directly written to the non-volatile memory 230.

For saving of data of the embedded memory 210b performed in step S13, data can be saved by another method, other than the method described above, in which the data stored in the embedded memory 210b is DMA transferred to the non-volatile memory 230 via the data bus 240 by making the data control circuit 220 control the DMA controller 210e installed in the electronic circuit 210.

If there is another controller (for example, a memory controller) of the embedded memory 210b, other than the CPU core 210a and the DMA controller 210e, the data stored in the embedded memory 210b can be transferred to the non-volatile memory 230 via the data bus 240 by controlling that controller.

As described above, with the configuration shown in FIG. 18, it is possible to achieve, through the use of the hardware, saving/restoration of not only register data of the CPU core 210a forming the electronic circuit 210 but also data of a volatile memory (in FIG. 18, the embedded memory 210b and the cache memory 210c) storing data to be processed by the electronic circuit 210. Thus, as compared with the configuration in which a data saving program is executed by the CPU core 210a so that data saving control is performed by software, this configuration can perform saving/restoration of data (and hence power-on/off) at higher speed.

When above-described data saving control is performed, the data stored in the embedded memory 210b cannot be abandoned without saving it because it is essential for restoring the state of the electronic circuit 210. On the other hand, since the data stored in the cache memory 210c is a duplicate of the data stored in the embedded memory 210b, even if no cache data exists after restoration of the state of the electronic circuit 210, it is only necessary to read the data stored in the embedded memory 210b again. Therefore, the data stored in the cache memory 210c may be abandoned without saving it.

However, if data saving of the electronic circuit 210 is performed when the CPU core 210a is using the cache data, the following problem arises. If the cache data is abandoned at the time of restoration of the electronic circuit 210, it appears to the CPU core 210a as if the cache data being used suddenly disappears. This may cause the CPU core 210a to malfunction. Thus, in a case where the configuration in which cache data is abandoned is adopted, it is desirable that the machine cycle of the electronic circuit 210 be monitored, such that data saving of the electronic circuit 210 is performed only when the cache data is not used by the CPU core 210a.

FIG. 19 deals with a case in which saving of the register data of the CPU core 210a, saving of data of the embedded memory 210b, and saving of data of the cache memory 210c are processed in a serial manner. However, the present invention is not limited to this specific configuration. For example, it is also possible to adopt a configuration in which processes are performed in a parallel manner, such that the data stored in the embedded memory 210b is saved by a DMA transfer via the data bus 240, the register data of the CPU core 210a is saved via the debug line, and the data stored in the cache memory 210c is abandoned. With this configuration, it is possible to perform saving/restoration of data (and hence power-on/off) at higher speed.

In a case where data saving control has to be performed by software by using the CPU core 210a due to the absence of the debug line control circuit 210d and the DMA controller 210e, it is necessary simply to save the data stored in the embedded memory 210b and the cache memory 210c to the non-volatile memory 240 via the data bus 240 by making a quick transition to a data saving program by the replacement of the register data, which has been described in FIG. 15.

Next, with reference to FIGS. 20A and 20B and also to FIG. 18 described above, a data restoring process of the data processing apparatus configured as described above will be described.

Figure 20A:
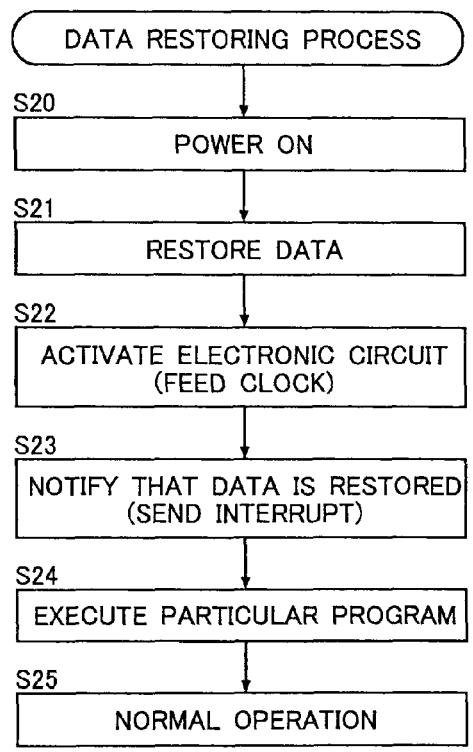
FIG. 20A is a flow chart showing an example of a data restoring process (in which interrupt control is performed)
Figure 20B:
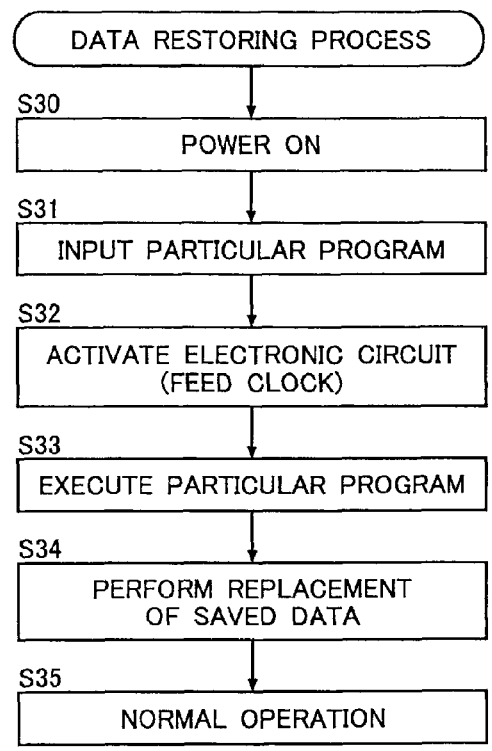
FIG. 20B is a flow chart showing an example of a data restoring process (in which data replacement is performed)

FIGS. 20A and 20B are flow charts each showing an example of a data restoring process. The flow charts shown in FIGS. 20A and 20B include a step of making the electronic circuit 210 execute a particular process (a wait process, a process of providing a notification to the user, or the like) at the time of data restoration of the electronic circuit 210.

First, a flow chart of FIG. 20A (a method of achieving the above-described particular process by interrupt control performed by the data control circuit 220) will be described.

In step S20, power is turned on. In the following step S21, the data saved to the non-volatile memory 230 is restored to the electronic circuit 210. Of data restoration performed in step S21, restoration of data of the embedded memory 210b and the cache memory 210c is simply performed via the debug line or the data bus 240 by controlling the embedded memory 210b or the cache memory 210c via the debug line just as the register data of the CPU core 210a is restored. For data restoration via the debug line, data may be restored from the non-volatile memory 230 to the data control circuit 220 by using the data bus 240 or a path through which the restored data is directly read from the non-volatile memory 230.

For restoration of data of the embedded memory 210b performed in step S21, data can be restored by another method, other than the method described above, in which the saved data of the non-volatile memory 230 is DMA transferred to the embedded memory 210b via the data bus 240 by making the data control circuit 220 control the DMA controller 210e installed in the electronic circuit 210.

If there is another controller (for example, a memory controller) of the embedded memory 210b, other than the CPU core 210a and the DMA controller 210e, the saved data of the non-volatile memory 230 can be transferred to the embedded memory 210b via the data bus 240 by controlling that controller.

After data restoration in step S21 is completed, in step S22, a drive clock is fed to the electronic circuit 210 by the data control circuit 220, whereby the CPU core 210a is activated.

In step S23, as a process of notifying the electronic circuit 210 of completion of saving/restoration of data, a predetermined interrupt is sent from the data control circuit 220. In the following step S24, a program (hereinafter a "specific program") prepared for achieving the above-described particular process is executed.

After the completion of the particular process in step S24, normal operation (operation performed before saving of data) of the electronic circuit 210 is resumed in step S25.

Next, a flow chart of FIG. 20B (a method of achieving the above-described particular process by data replacement performed by the data control circuit 220) will be described.

In step S30, power is turned on. In the following step S31, the aforementioned specific program, not the saved data of the non-volatile memory 230, is inputted to the electronic circuit 210.

After the completion of an input of the specific program in step S31, in step S32, a drive clock is fed to the electronic circuit 210 by the data control circuit 220, whereby the CPU core 210a is activated. In step S33, the specific program is executed.

Then, after the completion of the particular process in step S33, in step S34, the saved data of the non-volatile memory 230 is restored to the electronic circuit 210 by employing the replacement of register data, which has been described in FIG. 15.

In step S35, normal operation (operation performed before saving of data) of the electronic circuit 210 is resumed.

As described above, at the time of restoration of the data saved to the non-volatile memory 230, a particular process is executed prior to the resumption of the process the electronic circuit 210 was executing before saving of data. With this configuration, prior to the resumption of normal operation of the electronic circuit 210, it is possible to display a message notifying the user of the completion of saving/restoration of data, and urging him/her to get ready to resume normal operation or allowing him/her to make a decision either to maintain or abandon the contents of the process executed before data saving. This helps enhance the usability.

That is, since a drive clock to the electronic circuit 210 is interrupted while data thereof is being saved/restored, the electronic circuit 210 cannot decide by itself as to whether saving/restoration of data has been performed, and therefore tries to resume the operation it was performing before saving of data as if nothing had happened after the completion of restoration of data. By executing the particular process described above prior to the resumption of the operation, even if saving of data is performed, for example, during a power failure of an application (e.g. a game machine) that requires constant user operation, it is possible to send a message urging the user to get ready to the resumption of normal operation after restoration of data. This helps prevent the user from failing to cope with the situation due to a sudden resumption of the operation performed before saving of data.

Although FIGS. 20A and 20B deal with a flow of performing interrupt control and a flow of performing data replacement, respectively, as a method of achieving the above-described particular process, these flows may be performed singly or in combination.

For example, a flow of performing interrupt control shown in FIG. 20A has the advantage of making it easy to deal with a large program, but has a disadvantage in terms of a processing speed because it requires software processing using the CPU core 210a. On the other hand, a flow of performing data replacement shown in FIG. 20B has the advantage of making it possible to quickly execute a specific program by hardware processing, but has the disadvantage of difficulty in dealing with a large program. Thus, in a case where these flows are performed in combination, it is necessary simply to use either flow selectively depending on the contents of the specific program (the degree of complexity of a process).

Other than the interrupt control described above, examples as a means of notifying the electronic circuit 210 of saving/restoration of data include a configuration in which predetermined notification data that notifies of saving/restoration of data is transmitted via the data bus 240, and, when this notification data is detected by the electronic circuit 210, the aforementioned specific program is executed. However, adopting this configuration necessitates a program that makes the CPU core 210a continuously monitor the data bus 240.

The configuration described above deals with a case in which restoration of data is performed after a relatively prolonged period of power shut down, such as a sudden power failure. In a case where saving/restoration of data is performed at high frequency in a short period of time, for example, when power is shut down while the electronic circuit 210 is in a standby state, normal operation may be resumed immediately without executing the aforementioned specific program.

Next, with reference to FIGS. 21 and 22, an application to the concurrent restoration of a plurality of data processing apparatuses will be described in detail.

Figure 21:
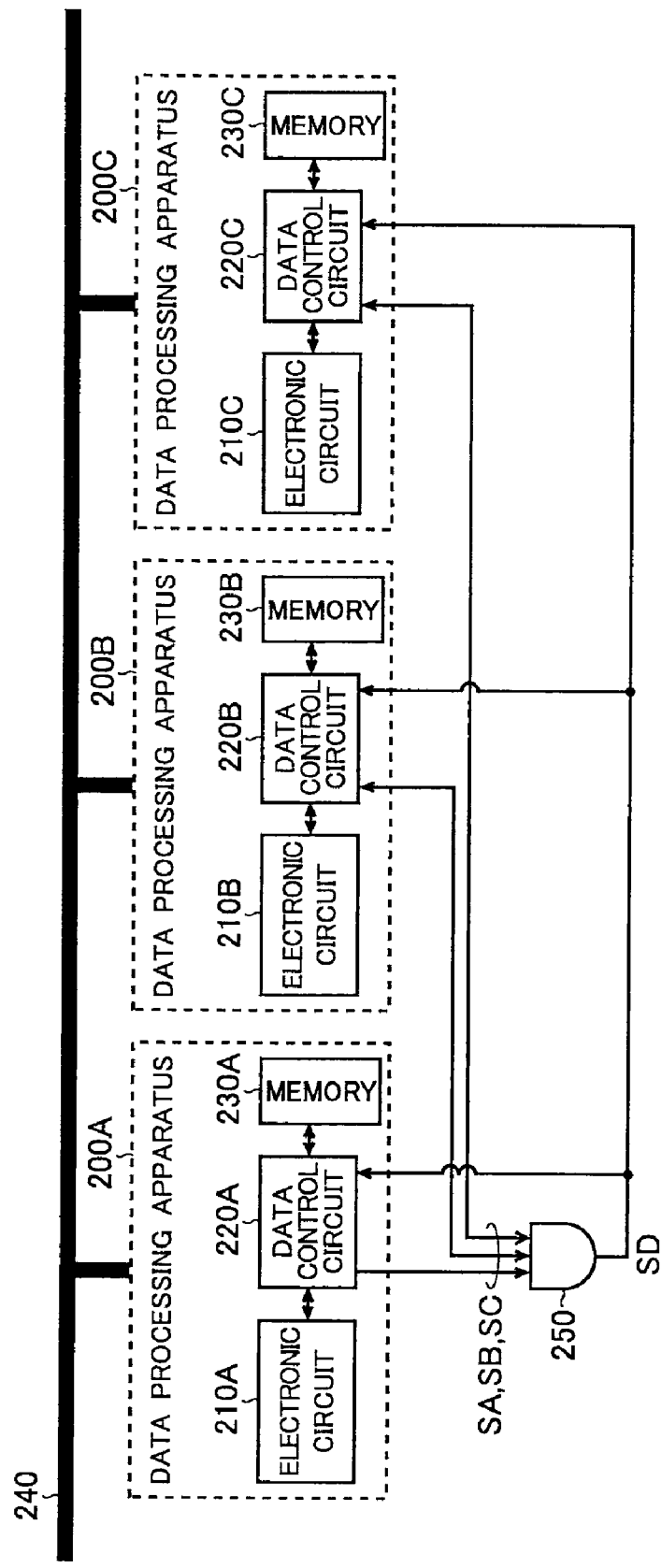
FIG. 21 is a block diagram showing an example of the configuration for achieving the concurrent restoration of a plurality of data processing apparatuses.

FIG. 21 is a block diagram showing an example of the configuration for achieving the concurrent restoration of a plurality of data processing apparatuses. Although FIG. 21 deals with a system provided with three data processing apparatuses 200A, 200B, and 200C, the number of data processing apparatuses is not limited to three.

As shown in FIG. 21, the data processing apparatus 200A includes an electronic circuit 210A, a data control circuit 220A, and a non-volatile memory 230A. The data processing apparatus 200B includes an electronic circuit 210B, a data control circuit 220B, and a non-volatile memory 230B. The data processing apparatus 200C includes an electronic circuit 210C, a data control circuit 220C, and a non-volatile memory 230C.

The electronic circuits 210A, 210B, and 210C each correspond to the electronic circuit 210 shown in FIG. 18. The data control circuits 220A, 220B, and 220C each correspond to the data control circuit 220 shown in FIG. 18. The non-volatile memories 230A, 230B, and 230C each correspond to the non-volatile memory 230 shown in FIG. 18.

Figure 22:
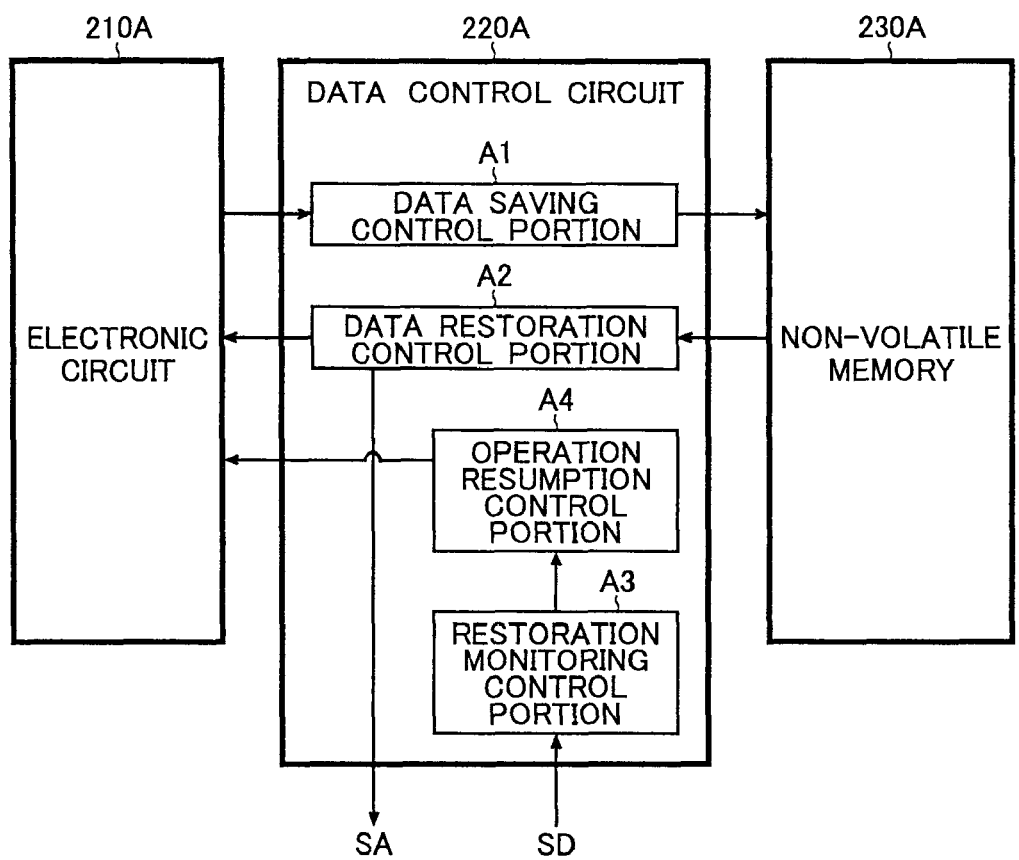
FIG. 22 is a block diagram showing the internal configuration of a data control circuit 220A.

FIG. 22 is a block diagram showing the internal configuration of the data control circuit 220A. It is to be noted that the data control circuits 220B and 220C have the same configuration as the data control circuit 220A.

As shown in FIG. 22, the data control circuit 220A includes a data saving control portion A1 that saves data of the electronic circuit 210A to the non-volatile memory 230A, a data restoration control portion A2 that restores the data saved to the non-volatile memory 230A to the electronic circuit 210A, and sends a data restoration notification signal SA indicating that restoration of data of the electronic circuit 210A is completed at the completion of data restoration, a restoration monitoring control portion A3 that monitors the data restoration state of the data processing apparatuses 200B and 200C (in the configuration example shown in FIGS. 21 and 22, the data restoration completion detection signal SD), and an operation resumption control portion A4 that stops the operation of the electronic circuit 210A until data restoration of the data processing apparatuses 200A, 200B, and 200C is completed. The data control circuits 220B and 220C have the same configuration as the data control circuit 220A.

That is, the data control circuits 220A, 220B, and 220C have, in addition to the data saving/restoring function described above, a function of sending the data restoration notification signals SA, SB, and SC, respectively, and a concurrent restoration function according to the data restoration completion detection signal The above-described data restoration notification signals SA, SB, and SC are each a binary logic signal that takes a low level while data restoration is being performed and takes a high level after data restoration is completed, for example. In the configuration example shown in FIG. 21, they are inputted to an AND logic unit 250.

The data restoration completion detection signal SD is an output signal of the AND logic unit 250 (an AND logic signal of the data restoration notification signals SA, SB, and SC). The data restoration completion detection signal SD takes a high level only when all of the data restoration notification signals SA, SB, and SC take a high level (only when data restoration of all the data processing apparatuses 200A, 200B, and 200C is completed); otherwise, it takes a low level.

As described above, with the configuration in which, as a means of generating the data restoration completion detection signal SD based on the data restoration notification signals SA, SB, and SC, the AND logic unit 250 is provided separately from the data processing apparatuses 200A, 200B, and 200C, it is possible to easily deal with the installation of an additional data processing apparatus. This, however, is not meant to limit the configuration of the invention in any way. For example, it is also possible to adopt a configuration in which the data control circuits 220A, 220B, and 220C are made to directly monitor each other's data restoration notification signals SA, SB, and SC. Alternatively, it is also possible to use, instead of the AND logic unit 250, any other logic operation circuit (such as a majority logic unit) as long as it does not interfere with the resumption of the operation of the data processing apparatuses 200A, 200B, and 200C.

As described above, since the data control circuits 220A, 220B, and 220C include the restoration monitoring control portion A3 and the operation resumption control portion A4, they stop feeding, even after data restoration thereof is completed, drive clocks to the electronic circuits 210A, 210B, and 210C until the data restoration completion detection signal SD takes a high level, and resume the feeding of drive clocks when the data restoration completion detection signal SD takes a high level.

As described above, by adopting the configuration in which a function of making the data control circuits 220A, 220B, and 220C monitor each other's data restoration status is provided so that the operations of all the data processing apparatuses 200A, 200B, and 200C are resumed when data restoration thereof is completed, it is possible to resume the operations of the data processing apparatuses 200A, 200B, and 200C with the same timing, even if the data processing apparatuses 200A, 200B, and 200C complete data restoration with different timing.

That is, this configuration prevents the data processing apparatus that has completed data restoration first from resuming operating while the other data processing apparatuses are still performing data restoration (while they stop processing). This makes it possible to prevent a malfunction.

In a case where a reduction in power consumption is achieved by shutting down the power to the electronic circuits 210A, 210B, and 210C while they are in a standby state, the data control circuits 220A, 220B, and 220C have to detect the operating status of the electronic circuits 210A, 210B, and 210C (whether they are in a standby state or not). As a means of detecting it, it is necessary simply to provide a status monitoring portion having the configuration similar to that shown in FIG. 12, the status monitoring portion detecting that the electronic circuits 210A, 210B, and 210C have entered a standby state when a data request signal is sent from the electronic circuits 210A, 210B, and 210C to a peripheral circuit (not shown in FIG. 21), and detecting that the electronic circuits 210A, 210B, and 210C have to be restored from the standby state when a response signal is sent from the peripheral circuit.

As described above, with the configuration in which the standby states of the electronic circuits 210A, 210B, and 210C are detected individually by monitoring the existing signal terminals thereof, it is possible to make effective use of the design assets of the electronic circuits 210A, 210B, and 210C without making major changes therein. This makes it possible to achieve enhancement of the usability of the electronic circuits 210A, 210B, and 210C and a reduction in standby power consumption in a short development period and at lower cost.

However, the means of detecting the operating status of the electronic circuits 210A, 210B, and 210C (whether they are in a standby state or not) is not limited to this specific configuration, but may be configured in any other way than is specifically described above.

For example, in a case where the electronic circuits 210A, 210B, and 210C each have an output terminal for outputting a process stop signal (for example, a HALT signal for setting a flag if a process is forcefully stopped due to some sort of trouble, such as a hang-up of the CPU), it is also possible to monitor the output terminal.

In a case where the electronic circuits 210A, 210B, and 210C each have a dedicated signal terminal for an indication of the standby state thereof, it is also possible to monitor the signal terminal.

Alternatively, in a case where the electronic circuits 210A, 210B, and 210C each have a function of sending data indicating that it is in a standby state via a general-purpose data input/output port (in FIG. 21, the data bus 240), it is also possible to monitor the data.

In terms of industrial applicability, the invention is useful in achieving enhancement of the usability (protecting data when the battery starts to run out, or enhancing the speed of process switching) of microprocessors, image processors, multimedia processors, IP cores, personal computers, network servers, mobile devices, game machines, PDAs and the like, and achieving a reduction in standby power consumption (an extension of the operable time of a battery-operated device, or an extension of battery life).

While the present invention has been described with respect to preferred embodiments, it will be apparent to those skilled in the art that the disclosed invention may be modified in numerous ways and may assume many embodiments other than those specifically set out and described above. Accordingly, it is intended by the appended claims to cover all modifications of the present invention which fall within the true spirit and scope of the invention.

What is claimed is:

1. A data processing controller in cooperation with an electronic circuit, the data processing controller and the electronic circuit being energized by a source voltage, the data processing controller comprising:
a signal receiving portion arranged to receive a signal generated upon detection of a fall in the source voltage at shutdown; and
a data saving control circuit that, in response to the signal receiving portion receiving the signal, saves to a non-volatile memory all data needed to restore a state of the electronic circuit within a period after a fall in a source voltage is detected until the source voltage falls to a lower limit voltage at which the data processing controller is guaranteed to operate.

2. The data processing controller of claim 1, further comprising:
a data restoration control circuit that restores, at power-on, the data saved to the non-volatile memory to the electronic circuit within a period after the source voltage rises to the lower limit voltage at which the data processing controller is guaranteed to operate until the electronic circuit begins to operate.

3. The data processing controller of claim 1 arranged to control the electronic circuit that saves/restores the data needed to restore the state thereof by performing serial data transfer.

4. The data processing controller of claim 3 arranged to control the electronic circuit having a first signal path used in a normal operation and a second signal path for switching flip-flops into a shift register configuration according to a predetermined control signal.

5. The data processing controller of claim 3 arranged to control the electronic circuit having a serial/parallel converting portion that performs, at a time of data saving, serial-to-parallel conversion on data inputted from the electronic circuit portion in a serial manner and then outputs the data thus converted to the non-volatile memory, and performs, at a time of data restoration, parallel-to-serial conversion on the data inputted from the non-volatile memory in a parallel manner and then outputs the data thus converted to the electronic circuit.

6. The data processing controller of claim 1, wherein the non-volatile memory stores register data in a non-volatile manner by exploiting ferroelectric hysteresis, a magnetroresistive effect of a magnetic substance, or a phase change of a device.

7. A data control circuit connectable to an electronic circuit including a volatile storage device, the data control circuit comprising:
a serial-in-parallel-out register;
a parallel-in-serial-out register;
a data saving control function portion arranged to save data of the volatile storage device in the electronic circuit to a non-volatile memory via a serial-in-parallel-out register, wherein the data in the electronic circuit is register data;
a data restoration control function portion arranged to restore the data saved to the non-volatile memory to the volatile storage device of the electronic circuit via the serial-in-parallel-out register;
a power supply control portion controlling turn-on/shutdown of power to the electronic circuit; and
a status monitoring portion monitoring an operating status of the electronic circuit, wherein the data control circuit:
saves the register data and shuts down power to the electronic circuit when the electronic circuit has entered a standby state, and
turns-on power to the electronic circuit and restores the register data when the electronic circuit has to be restored from the standby state;
wherein the status monitoring portion:
monitors an input/output signal exchanged between the electronic circuit and a peripheral circuit, and checks the operating status of the electronic circuit,
detects when a data request signal is sent from the electronic circuit to the peripheral circuit, that the electronic circuit has entered a standby state, and
detects when a response signal is sent from the peripheral circuit to the electronic circuit, that the electronic circuit has to be restored from the standby state.

8. A data control circuit connectable to an electronic circuit including a volatile storage device, the data control circuit comprising:
a serial-in-parallel-out register;
a parallel-in-serial-out register;
a data saving control function portion arranged to save data of the volatile storage device in the electronic circuit to a non-volatile memory via a serial-in-parallel-out register, wherein the data in the electronic circuit is register data;
a data restoration control function portion arranged to restore the data saved to the non-volatile memory to the volatile storage device of the electronic circuit via the serial-in-parallel-out register;
wherein the data control circuit is arranged to perform replacement of the register data according to a process to be executed by the electronic circuit, and to perform data saving operation and data restoration operation simultaneously when performing replacement of the register data.

9. A data processing apparatus, comprising:
an electronic circuit; and
a data control circuit connected to the electronic circuit, wherein the data control circuit comprises:
a data saving control portion that saves data of the electronic circuit to an outside of the electronic circuit;
a data restoration control portion that restores the data saved to the outside of the electronic circuit to the electronic circuit;
a restoration monitoring control portion that monitors a data restoration state of another data processing apparatus; and
an operation resumption control portion that stops an operation of the electronic circuit until data restoration of all the data processing apparatuses is completed,
wherein the data restoration control portion sends a notification signal indicating that data restoration of the electronic circuit is completed at a completion of data restoration.

10. The data processing apparatus of claim 9, wherein by monitoring the notification signal sent from each of a plurality of data processing apparatuses or a logic operation signal thereof, the restoration monitoring control portion judges whether or not data restoration of all the data processing apparatuses is completed.

11. The data processing apparatus of claim 9, wherein the operation resumption control portion controls a drive clock to be fed or not to be fed to the electronic circuit.

12. A data processing apparatus comprising:
an electronic circuit; and
a data control circuit connected to the electronic circuit;
wherein the data control circuit comprises:
a data saving control portion that saves data of the electronic circuit to an outside of the electronic circuit;
a data restoration control portion that restores the data saved to the outside of the electronic circuit to the electronic circuit;
a restoration monitoring control portion that monitors a data restoration state of another data processing apparatus; and
an operation resumption control portion that stops an operation of the electronic circuit until data restoration of all the data processing apparatuses is completed,
wherein the data control circuit comprises a status monitoring portion that monitors an operating status of the electronic circuit, and wherein, based on a monitoring result, the data control circuit controls data saving/restoration of the electronic circuit, and
wherein when a data request signal is sent from the electronic circuit to a peripheral circuit, the status monitoring portion detects that the electronic circuit has entered a standby state, and wherein, when a response signal is sent from the peripheral circuit to the electronic circuit, the status monitoring portion detects that the electronic circuit has to be restored from the standby state.

13. The data processing apparatus of claim 12, wherein the status monitoring portion judges an operating status of the electronic circuit by monitoring a dedicated signal indicating a standby state of the electronic circuit.

14. A data processing apparatus, comprising:
an electronic circuit; and
a data control circuit connected to the electronic circuit;
wherein the data control circuit comprises:
a data saving control portion that saves data of the electronic circuit to an outside of the electronic circuit;
a data restoration control portion that restores the data saved to the outside of the electronic circuit to the electronic circuit;
a restoration monitoring control portion that monitors a data restoration state of another data processing apparatus; and
an operation resumption control portion that stops an operation of the electronic circuit until data restoration of all the data processing apparatuses is completed,
wherein the data control circuit comprises a status monitoring portion that monitors an operating status of the electronic circuit, based on a monitoring result, the data control circuit controls data saving/restoration of the electronic circuit,
wherein the status monitoring portion judges an operating status of the electronic circuit by monitoring a process stop signal from the electronic circuit.

15. A data processing apparatus, comprising:
an electronic circuit; and
a data control circuit connected to the electronic circuit;
wherein the data control circuit comprises:
a data saving control portion that saves data of the electronic circuit to an outside of the electronic circuit;
a data restoration control portion that restores the data saved to the outside of the electronic circuit to the electronic circuit;
a restoration monitoring control portion that monitors a data restoration state of another data processing apparatus; and an operation resumption control portion that stops an operation of the electronic circuit until data restoration of all the data processing apparatuses is completed, wherein the data control circuit comprises a status monitoring portion that monitors an operating status of the electronic circuit, based on a monitoring result, the data control circuit controls data saving/restoration of the electronic circuit, and wherein the status monitoring portion judges an operating status of the electronic circuit by monitoring data exchanged via a general-purpose data input/output port of the electronic circuit.

16. A data control circuit, comprising:

a data saving control function portion connected to an electronic circuit having a data input port and a data output port that are used for making access to a storage device provided in the electronic circuit from outside the electronic circuit, the data saving control function portion saving register data of the electronic circuit to an outside of the electronic circuit via the data output port;

a data restoration control function portion restoring the register data saved to the outside the electronic circuit to a register of the electronic circuit via the data input port;

a power supply control portion controlling turn-on/shutdown of power to the electronic circuit; and a status monitoring portion monitoring an operating status of the electronic circuit, wherein the data control circuit performs when the electronic circuit has entered a standby state, saving of the register data and shutdown of power to the electronic circuit, when the electronic circuit has to be restored from the standby state, turn-on of power to the electronic circuit and restoration of the register data, wherein the status monitoring portion monitors an input/output signal exchanged between the electronic circuit and a peripheral circuit, and checks the operating status of the electronic circuit, and wherein the status monitoring portion detects when a data request signal is sent from the electronic circuit to the peripheral circuit, that the electronic circuit has entered a standby state, when a response signal is sent from the peripheral circuit to the electronic circuit, that the electronic circuit has to be restored from the standby state.

17. A data control circuit, comprising:

a data saving control function portion connected to an electronic circuit having a data input port and a data output port that are used for making access to a storage device provided in the electronic circuit from outside the electronic circuit, the data saving control function portion saving register data of the electronic circuit to an outside of the electronic circuit via the data output port;

a data restoration control function portion restoring the register data saved to the outside the electronic circuit to a register of the electronic circuit via the data input port;

wherein the data control circuit performs replacement of the register data according to a process to be executed by the electronic circuit, and wherein the data control circuit performs data saving operation and data restoration operation simultaneously when performing replacement of the register data.

18. A data processing controller in cooperation with an electronic circuit and a peripheral circuit, comprising:

a status monitoring portion arranged to monitor signals exchanged between the electronic circuit and the peripheral circuit; and a power supply control portion arranged to control the power supply to the electronic circuit between an operative state and a standby state in response to the status monitoring portion, wherein the status monitoring portion informs the power supply control portion of the standby state when a data request signal is sent from the electronic circuit to the peripheral circuit and informs the power supply control portion of the operative state when a response signal is sent from the peripheral circuit to the electronic circuit.

19. The data processing controller of claim 18 further comprising:

a data saving control function portion arranged to save data of the electronic circuit; and a data restoration control function portion arranged to restore the saved data back to the electronic circuit, wherein the status monitoring portion informs the data saving control function portion of the standby state to save the data when a data request signal is sent from the electronic circuit to the peripheral circuit and informs the data restoration control function portion of the operative state to restore the data when a response signal is sent from the peripheral circuit to the electronic circuit.

20. A data processing controller in cooperation with an electronic circuit and a peripheral circuit, comprising:

a status monitoring portion arranged to monitor signals exchanged between the electronic circuit and the peripheral circuit;

a data saving control function portion arranged to save data of the electronic circuit; and a data restoration control function portion arranged to restore the saved data back to the electronic circuit, wherein the status monitoring portion informs the data saving control function portion of the standby state to save the data when a data request signal is sent from the electronic circuit to the peripheral circuit and informs the data restoration control function portion of the operative state to restore the data when a response signal is sent from the peripheral circuit to the electronic circuit.

* * * * *